(12) United States Patent
Xu et al.

(10) Patent No.: US 12,125,124 B1
(45) Date of Patent: *Oct. 22, 2024

(54) MATRIX TRANSPOSE HARDWARE ACCELERATION

(71) Applicant: Amazon Technologies, Inc., Seattle, WA (US)

(72) Inventors: Kun Xu, Austin, TX (US); Ron Diamant, Santa Clara, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/118,251

(22) Filed: Mar. 7, 2023

Related U.S. Application Data

(63) Continuation of application No. 17/029,609, filed on Sep. 23, 2020, now Pat. No. 11,636,569.

(51) Int. Cl.

| | |
|---|---|
| *G06T 3/60* | (2024.01) |
| *G06F 12/0862* | (2016.01) |
| *G06N 3/04* | (2023.01) |
| *G06N 3/08* | (2023.01) |
| *G06T 1/60* | (2006.01) |
| *G06T 3/606* | (2024.01) |
| *G06V 10/94* | (2022.01) |

(52) U.S. Cl.
CPC ............ *G06T 1/60* (2013.01); *G06F 12/0862* (2013.01); *G06N 3/04* (2013.01); *G06N 3/08* (2013.01); *G06T 3/606* (2013.01); *G06F 2212/455* (2013.01); *G06V 10/95* (2022.01)

(58) Field of Classification Search
CPC .... G06F 12/0607; G06F 9/3455; G06F 9/355; G06F 13/1647; G06F 12/0207; G06F 2207/4824; G06F 12/0692; G06F 13/1657; G06N 3/02; G06T 2207/20081; G06T 2207/20084
See application file for complete search history.

(56) References Cited

U.S. PATENT DOCUMENTS

| | | |
|---|---|---|
| 2020/0310803 A1 | 10/2020 | Gradstein et al. |
| 2020/0356367 A1 | 11/2020 | Van Lunteren |

OTHER PUBLICATIONS

U.S. Appl. No. 17/029,609, "Non-Final Office Action," mailed Jun. 29, 2022, 14 pages.
U.S. Appl. No. 17/029,609, "Notice of Allowance," mailed Dec. 15, 2022, 7 pages.

*Primary Examiner* — Hau H Nguyen
(74) *Attorney, Agent, or Firm* — Kilpatrick Townsend & Stockton LLP

(57) ABSTRACT

In one example, an apparatus comprises: a buffer memory; and a memory access circuit configured to: fetch, from a first memory, a set of first groups of data elements of a first matrix, each first group of data elements being stored at consecutive memory addresses at the first memory; based on a first configuration, store the set of first groups of data elements at consecutive memory addresses or at non-consecutive memory addresses at the buffer memory; based on a second configuration that defines a memory address offset, fetch a set of second groups of the data elements from the buffer memory, each second group of the data elements being stored at consecutive memory addresses of the buffer memory, each second group being separated by the memory address offset in the buffer memory; and store each fetched second group at consecutive addresses of a destination memory to form a second matrix.

20 Claims, 25 Drawing Sheets

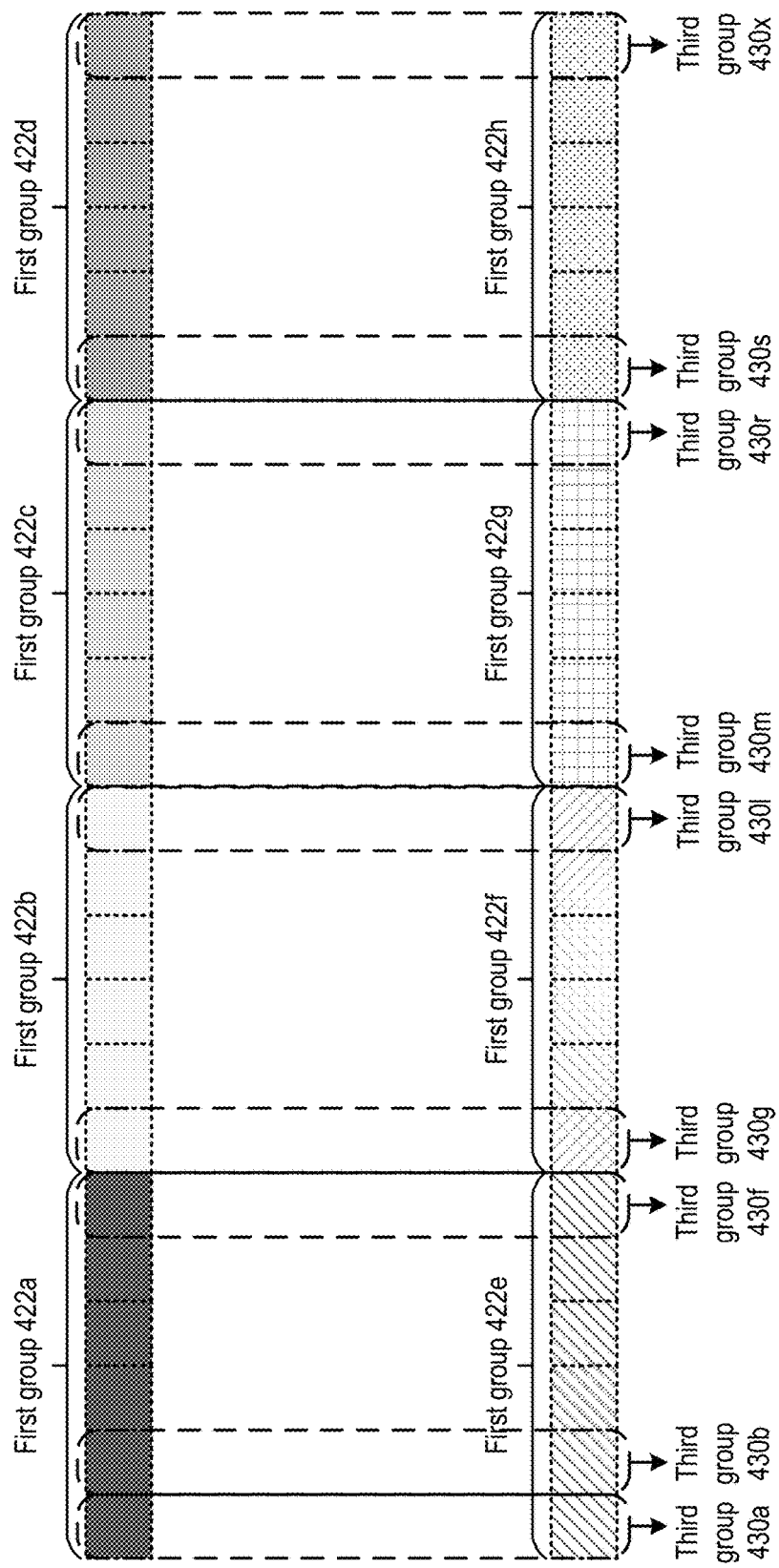

MATRIX TRANSPOSE HARDWARE ACCELERATION

CROSS-REFERENCE TO RELATED APPLICATION

This application claims priority to and is a continuation of U.S. patent application Ser. No. 17/029,609, filed Sep. 23, 2020, and entitled "MATRIX TRANSPOSE HARDWARE ACCELERATION," the content of which is hereby incorporated by reference in its entirety for all purposes.

BACKGROUND

Artificial neural networks are computing systems with an architecture based on biological neural networks. An artificial neural network can include a set of weights. Through computations, the weights can be combined with input data to perform an inferencing operation. For example, for a computer vision application to detect an object, the artificial neural network can combine the weights with an input image to extract certain features of the object from the image. Based on the extracted features, the artificial neural network can generate a decision of whether the object is in the image. Artificial neural networks can be trained, using training data in a training operation, to learn about how to perform the inferencing operation for an application.

An artificial neural network typically performs computations on data in the form of matrices to perform the inferencing operations and the training operations. For example, input data and weights can be organized into matrices. The artificial neural network can perform various matrix computations, such as dot-product computations between the input data and weight matrices, at each neural network layer for a computing task. In addition, the data and weights matrices can be pre-processed to support the matrix computations.

BRIEF DESCRIPTION OF THE DRAWINGS

Various embodiments in accordance with the present disclosure will be described with reference to the drawings, in which:

FIGS. 4A-4F illustrate examples of matrix transpose operations supported by certain aspects of the present disclosure;

DETAILED DESCRIPTION

Figure 1:
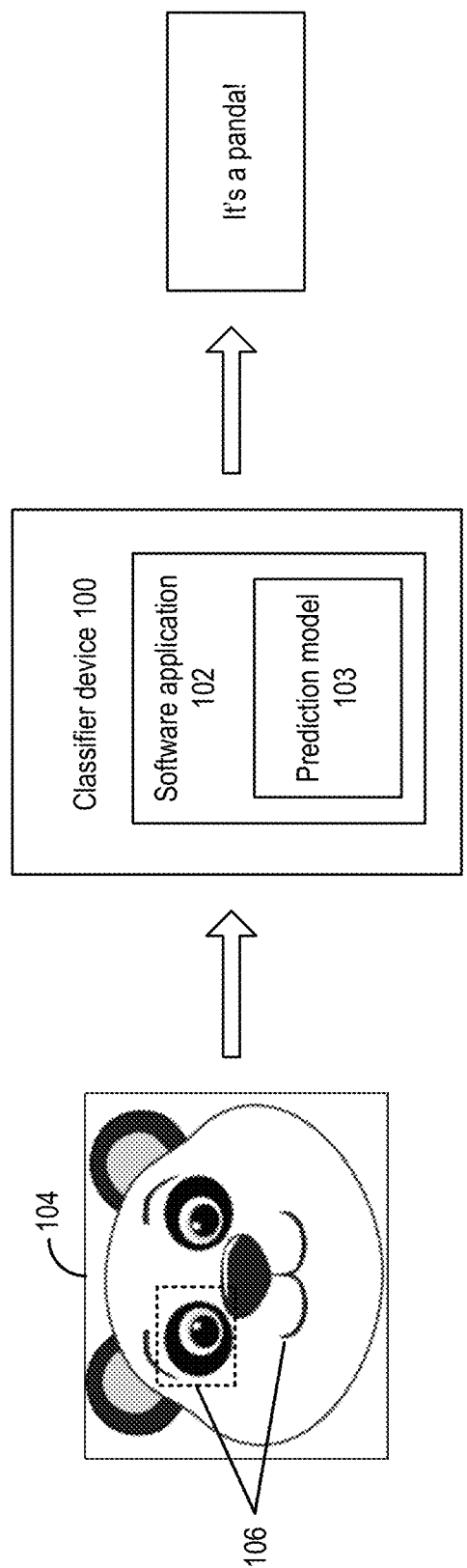
FIG. 1 illustrates an example classifier device that uses techniques disclosed herein to process data.

Examples of the present disclosure relate to neural network processing, and more specifically, to techniques of accelerating matrix transpose operations to support neural network computations.

An artificial neural network (hereinafter, neural network) is typically implemented in a computing system, such as a neural network hardware accelerator, to have an architecture based on biological neural networks, and to process input data in an analogous fashion as biological neural networks. A neural network typically includes a number of cascading neural network layers, with each layer including a set of weights. In an inferencing operation, each layer can combine input data (e.g., inputs to the neural network layer, intermediate output from a previous layer, etc.) with the weights to generate intermediate outputs, and propagate the intermediate outputs to a higher neural network layer. The forward propagation operations can start at the first neural network layer and end at the highest neural network layer. The forward propagation operation at each neural network layer can represent different stages of extraction and processing of the inputs to the neural network. The neural network can then generate a decision based on the output of the highest neural network layer.

The set of weights of the neural network can be generated and/or updated by a training operation to improve the likelihood of the neural network generating a correct decision. The training operation can be performed by the same computing system (e.g., a neural network hardware accelerator) that performs the inferencing operation. An example training operation can use a gradient decent scheme. Specifically, as part of the training operation, the aforementioned forward propagation operations can be performed on a training input data set, using the set of weights at each neural network layer, to generate a training output data set at the highest level neural network layer. The training output data, as well as target output data, can be input to a loss gradient operation to compute loss gradients representing a partial derivative of the output errors (between the training output data and the target output data) with respect to the training output data. The loss gradients can be propagated back to the highest neural network layer.

A set of backward propagation operations can then be performed at each neural network layer. At the highest neural network layer, a first backward propagation operation can be performed, in which the loss gradients can be combined with the intermediate outputs of the previous neural network layer (the second highest neural network layer) to generate first weight gradients for the highest neural network layer. The first weight gradients can represent a partial derivative of the output errors with respect to the weights of the highest neural network layer. The first weight gradients can be used to update the weights of the highest neural network layer to minimize the output errors. Moreover, the loss gradients can be combined with the original weights of the highest neural network layer to obtain first error gradients. The first error gradients can then be propagated backward to the second highest neural network layer, which can then perform a second backward propagation operation to generate second weight gradients and second error gradients, and propagate the second data gradients to the preceding layer. The backward propagation operation can be performed from the highest neural network layer backward to the lowest neural network layer to compute weight gradients to update the weights at each layer. The training operation can be repeated for the same input data set for a number of iterations until a loss objective (e.g., a threshold first output error from the highest neural network layer) is achieved.

A neural network hardware accelerator can be programmed to implement an artificial neural network to perform computing tasks. A neural network hardware accelerator typically performs computations of data in the form of matrices for the inferencing operations and the training operation. For example, the combination of inputs and weights in the forward propagation operations, the combination of intermediate outputs and error gradients, the combination of weights and weight gradients in the backward propagation operations, etc., can be in the form dot-product computations between matrices. To accelerate the dot-product computations, the neural network hardware accelerator may include dedicated circuits, such as arithmetic circuits, to perform the arithmetic operations involved in the dot-product computations.

In addition, the data matrices (input and intermediate outputs, weights, etc.) can be pre-processed to support the matrix computations. One example of a pre-processing operation may include a matrix transpose operation, in which the indices of two dimensions of a matrix are swapped. For example, for a two-dimensional matrix organized into rows and columns, a transpose operation can be performed by swapping the matrix row indices and matrix column indices, which can result in flipping the matrix over its diagonal. Matrix transpose operations can be performed during the training operation of a neural network. For example, the weight matrix of a neural network layer is combined with inputs to the neural network layer in a forward propagation operation, but in the backward propagation operation of that layer, a transposed version of the weight matrix is combined with an input error gradient matrix (received from the next layer) to compute an output error gradient matrix to be propagated to the preceding layer. The transposed version of the weight matrix is also combined with the weight gradients to adjust the weights. In addition, in a case where the neural network is configured as a convolutional neural network (CNN), the intermediate outputs matrix from a forward propagation operation of a neural network layer can also be transposed, and combined with the input error gradients matrix (received from the next layer) to generate weight gradients in the backward propagation of that neural network layer.

The matrix transpose operation can be performed by a software application which controls the neural network hardware accelerator to perform the inferencing and training operations. But given that the software application is typically executed on a general purpose computer which lacks dedicated hardware to perform the transpose operation, using the application software to perform matrix transpose operation can introduce substantial latency to the matrix transpose operations, which in turn can reduce the throughput of the inferencing operations and training operations that use the transposed matrices. The latency of the matrix transpose operation is further increased when multi-dimensional matrices (e.g., four dimensional (4D) matrices) are involved in the matrix transpose operation, which increases the complexity of the matrix transpose operation and makes it even more costly, in terms of time and performance, to perform the matrix transpose operations using software.

Examples of the present disclosure relate to neural network processing, and more specifically, to techniques of accelerating matrix transpose operations to support neural network computations. In some examples, a memory system, which includes a buffer memory and a memory access circuit, can be configured to perform read and write operation at the buffer memory to transpose a first matrix stored in a source memory to form a second matrix, and to store the second matrix at a destination memory. The source and destination memories can include dynamic random access memory (DRAM) devices, static random access memory (SRAM) devices, high bandwidth memory (HBM) devices, etc., whereas the buffer memory can include various on-chip devices such as, for example, SRAM devices, flip-flops, and registers. In some example, the memory system can be part of a neural network hardware accelerator.

Specifically, the first matrix can be multi-dimensional, with each data element associated with indices in a first dimension, a second dimension, a third dimension, a fourth dimension, etc. The first dimension can be of the lowest dimension, the second dimension can be the next level dimension above the first dimension, the third dimension can be the next level dimension above the second dimension, while the fourth dimension can be of the highest dimension. Data elements associated with consecutive indices in the first dimension can be stored at a range of consecutive addresses at the source memory to form first groups. Pairs of the first groups associated with consecutive indices in the second dimension can be stored adjacent to each other at the source memory to form a second group. As used herein, the storage of two groups as being adjacent to each other at a memory can include, for example, assigning the two groups to two contiguous memory regions in the memory, or storing a memory pointer to indicate that a second one of the two groups immediately follow a first one of the two groups. Pairs of the second groups associated with consecutive indices in the third dimension can be stored adjacent to each other at the source memory to form a third group. Finally, pairs of the third groups associated with consecutive indices in the fourth dimension can be stored adjacent to each other at the source memory.

As part of the write operation, the memory access circuit can fetch each first group of data elements, and store each first group at a pattern of write addresses at the buffer memory. The pattern of write addresses can be defined based on whether a non-x-striding operation or an x-striding operation is to be performed. In the non-x-striding operation, the memory access circuit can store each first group, each comprising data elements associated with consecutive indices at the first dimension, at consecutive addresses at the buffer memory. In some examples, the buffer memory can include a plurality of memory banks, and each first group can be stored at consecutive addresses at each memory bank, while adjacent first groups can be stored at adjacent memory banks. As data elements of consecutive indices at the first dimension are still stored at consecutive addresses at the buffer memory, the shape of the first matrix can be retained.

On the other hand, an x-striding operation is to stride across lowest dimension elements with a certain x-striding distance so that elements in the lowest dimension (e.g., the first dimension) are store adjacent to corresponding elements in a higher dimension (e.g., the second dimension, the third dimension, etc.) instead of adjacent to each other. To perform the x-striding operation, the memory access circuit can stride, depending on the x-striding distance, across each stride group which can be a first group, a second group, or a third group, for example, to select corresponding data elements having the same index in the first dimension (the lowest dimension) from each stride group, and store the corresponding data elements at consecutive addresses at the buffer memory to form a new first group, and multiple new first groups can be formed for each index in the first dimension. For example, the memory access circuit can obtain each data element (e.g., a first data element, a second data element, a third data element, etc.) from each first group, each second group, or each third group depending on the x-striding distance. The memory access circuit can then store each first data elements at a first memory address at each memory bank, each second data element at a second memory address at each memory bank, and each third data element at a third memory address at each memory bank. As a result of the x-striding operation, data elements having consecutive indices in a higher dimension (e.g., second, third, or fourth dimension), rather than in the first dimension, are stored in consecutive addresses in the memory buffer, which can result in a reshaping and a transpose of the first matrix.

In addition, as part of the read operation, the memory access circuit can fetch each first group, or each new first group, from the buffer memory, and store the groups at the destination memory to form a second matrix. The fetching of the first groups can follow a memory read address pattern to perform a non-y-striding operation, or to perform a y-striding operation. In a non-y-striding operation, adjacent first groups (e.g., first groups stored in adjacent memory banks) are stored as adjacent groups in the destination memory, so pairs of first groups associated with consecutive indices in the second dimension remain adjacent to each other to form a second group, and the shape of the first matrix can be retained. On the other hand, y-striding is to stride across the first groups with a certain y-striding distance so that first groups associated with consecutive indices in a higher dimension, rather than in the second dimension, are put adjacent each other to form new second groups. To perform a y-striding operation, the memory access circuit can fetch a pair of first groups from non-neighboring memory banks by skipping a number of memory banks based on the y-striding distance, and store the pair of first groups as adjacent first groups in the destination memory. As a result of the y-striding operation, first groups having consecutive indices in a higher dimension than the second dimension (e.g., third, or fourth dimension) are stored as adjacent groups in the destination memory, which can also result in a reshaping and a transpose of the first matrix.

In some examples, the memory access circuit can be configured based on programming information to perform at least one of the non-x-striding operation, the x-striding operation, the non-y-striding operation, and the y-striding operation to transpose the multi-dimensional first matrix. The programming information can also define the x-striding distance and y-striding distance. As to be described below, the memory access circuit can perform transpose operations between different dimensions based on, for example, an x-striding operation, a y-striding operation, or an x-striding operation followed by one or more y-striding operations.

With the disclosed techniques, matrix transpose operations can be performed based on read and write operations at a memory buffer of the neural network hardware accelerator, rather than by a software application executing on a general purpose computer, which can improve the throughput of the transpose operation. Moreover, by providing the capability to program the memory access circuit to perform different combinations of x-striding and y-striding operations as well as non-striding operations, different reshaping/transpose operations between different dimensions for a multi-dimensional matrix (e.g., a 4D matrix) can be achieved to support a wide range of transpose operations for different neural network computations.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0$, $x_1$, $x_2$, ... $x_n$) corresponding to a predetermined pixel within image 104, and transmit one or more weights with the received pixel value to layer 209. In a case where prediction model 203 is a DNN, each processing node of layer 207, such as nodes 208a and 208b, can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \sum_{i=0}^{n} (W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel)

of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \qquad \text{(Equation 2)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = ReLU(\text{Sum}_{210a}) \qquad \text{(Equation 3)}$$

Optionally, prediction model 103 may include a pooling layer to reduce the number of intermediate outputs (e.g., $\text{sum}_{210a}$) of layer 209. The pooling layer may group the intermediate outputs and perform a pooling operation on each group. The pooling operation may include such as max pooling (e.g., selecting a maximum intermediate output within the group), min pooling (e.g., selecting a minimum intermediate output), average pooling (e.g., finding an average of each group), summation pooling (finding a sum of each group), etc., and the reduced intermediate outputs can be processed by the activation function to generate first outputs of layer 209. The pooling operation can be performed to reduce the computation cost associated with activation function processing.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

Although FIG. 2B illustrates a convolution operation on a two-dimensional (2D) matrix, it is understood that the convolution operation can be performed on a multi-dimensional matrix having a higher number of dimensions. FIG. 2C illustrates examples of multi-dimensional matrices. For example, matrix 260 can be a two-dimensional (2D) matrix having a first dimension (x) and a second dimension (y). Each data element of matrix 260, $D_{x,y}$, can be associated with a first index in the first dimension and a second index in the second dimension. Moreover, matrix 270 can be a three-dimensional (3D) matrix having the first dimension (x), the second dimension (y), and a third dimension (z), and can be formed by groups of 2D matrices. Each data element of matrix 270, $D_{x,y,z}$, can be associated with a first index in the first dimension, a second index in the second dimension, and a third index in the third dimension. Further, matrix 280 can a four-dimensional (4D matrix) having the first dimension (x), the second dimension (y), the third dimension (z), and a fourth dimension (w). Each data element of matrix 280, $D_{x,y,z,w}$, can be associated with a first index in the first dimension, a second index in the second dimension, a third index in the third dimension, and a fourth index in the fourth dimension.

Figure 2A:
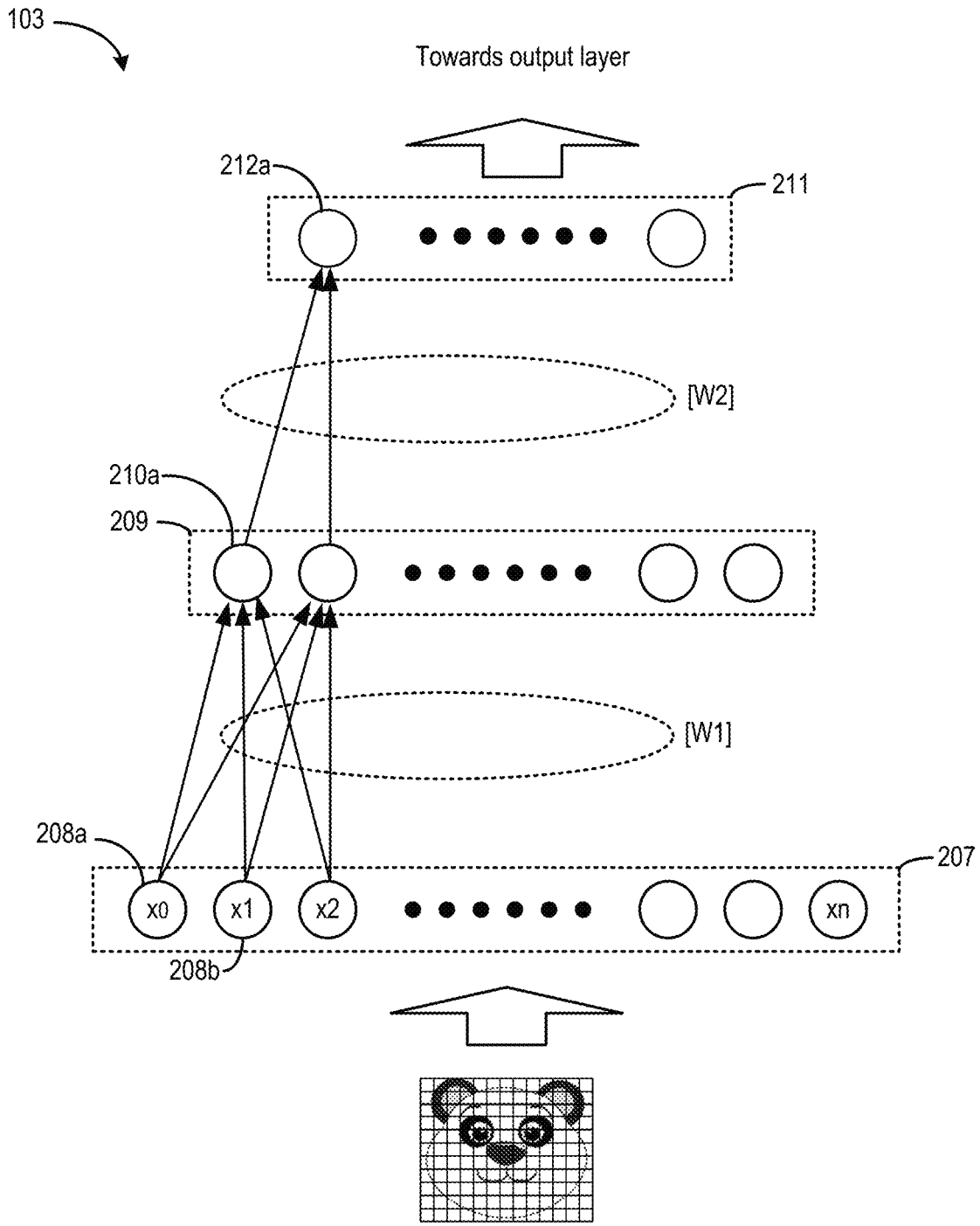
FIGS. 2A-2C are simplified block diagrams illustrating a prediction model and the computations that use techniques disclosed herein, according to certain aspects of the present disclosure.
Figure 2B:
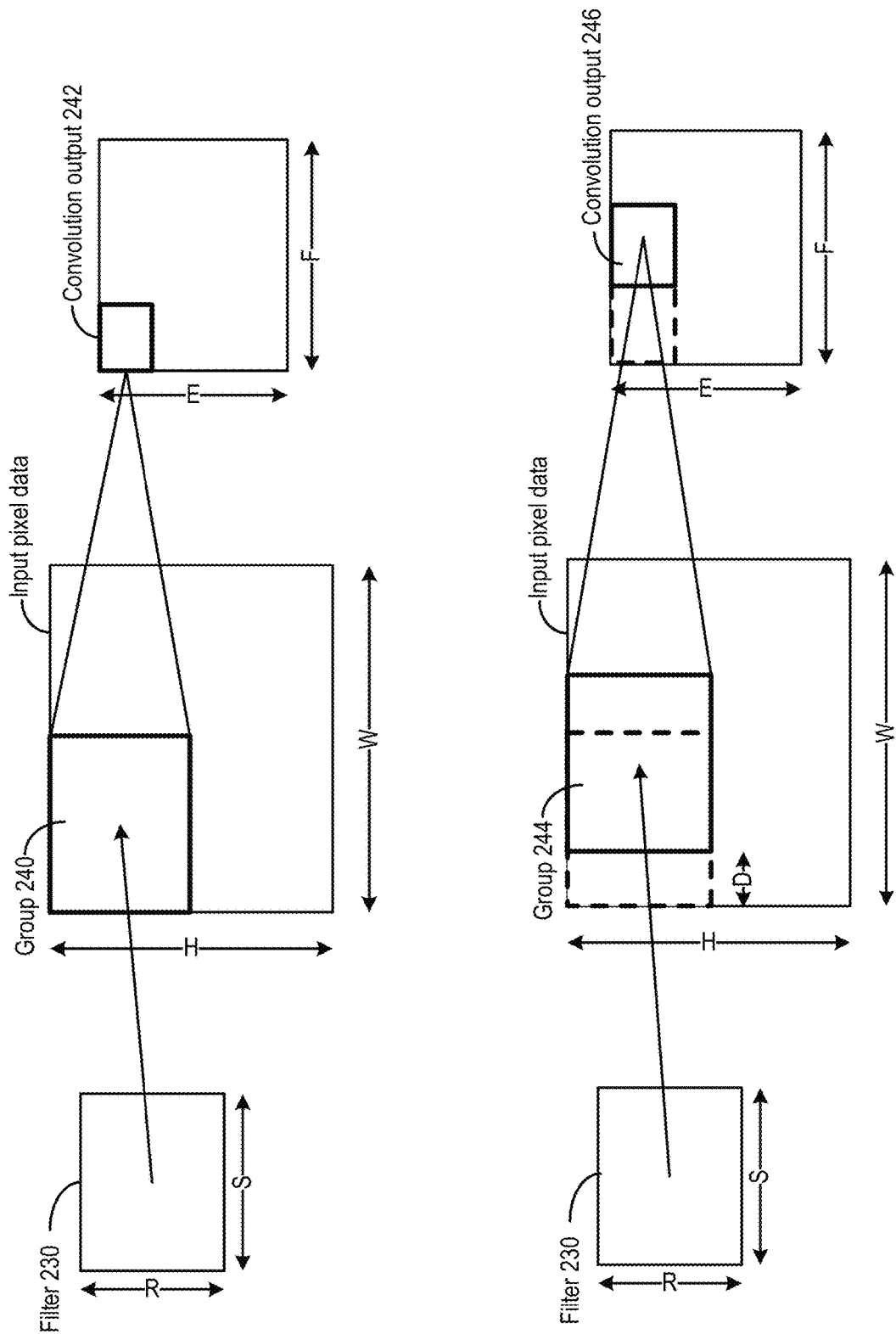
Figure 2C:
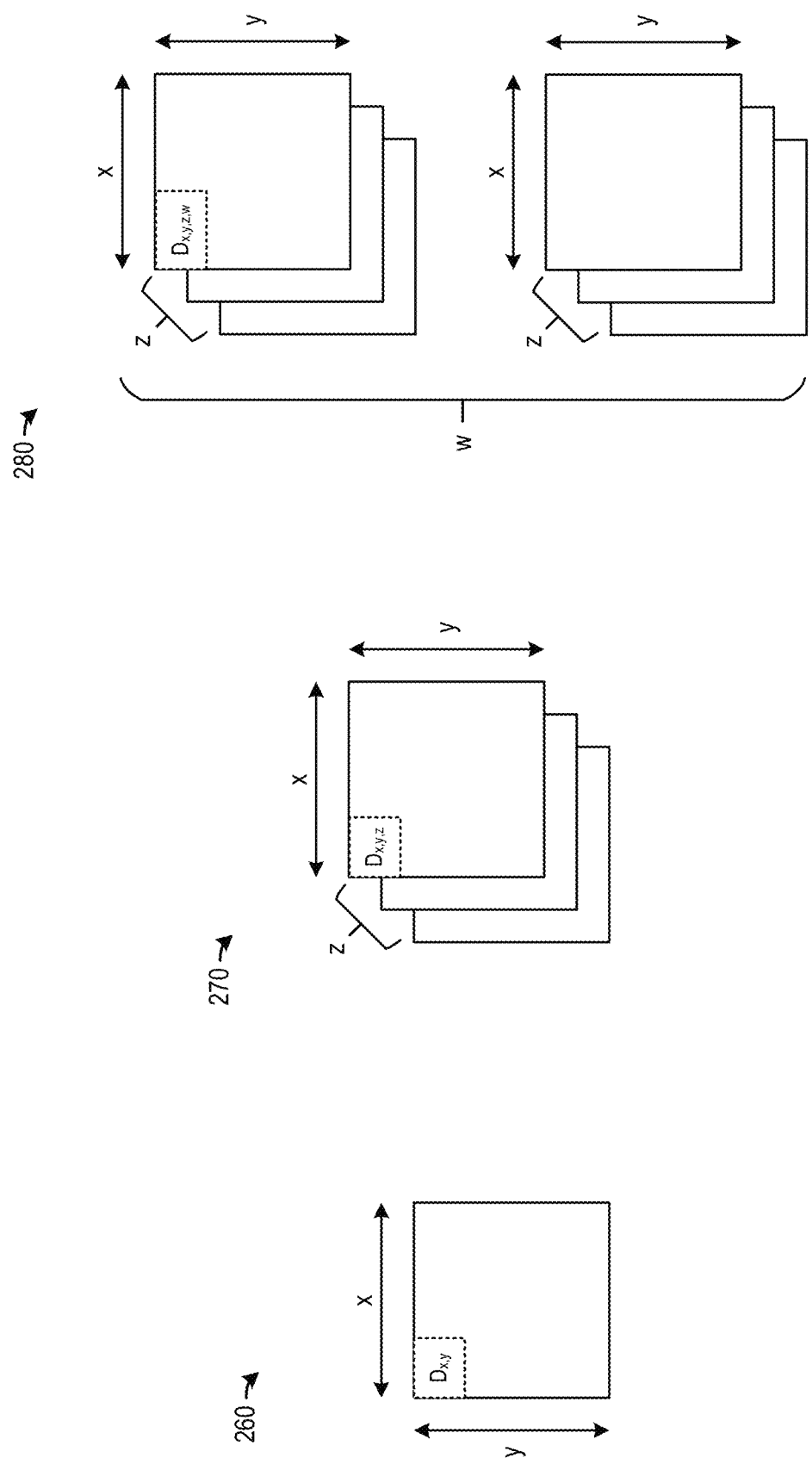

The weights and filter coefficients described in FIG. 2A and FIG. 2B can be generated and updated by a training process, to improve the likelihood of prediction model 103 generating a correct decision. Referring to the examples of FIG. 2A and FIG. 2B, prediction model 103 can be trained based on a set of training images. The training images can include images of different pandas, images of other animals and other artifacts, etc. Prediction model 103 can process those images and generate different output vectors. The weights in the neural network layers of prediction model 103 can be updated to maximize the number of correct decisions (e.g., detection of a panda in training images that contain a panda, non-detection of a panda in training images that do not contain an panda, etc.) by the prediction model 103.

Figure 3A:
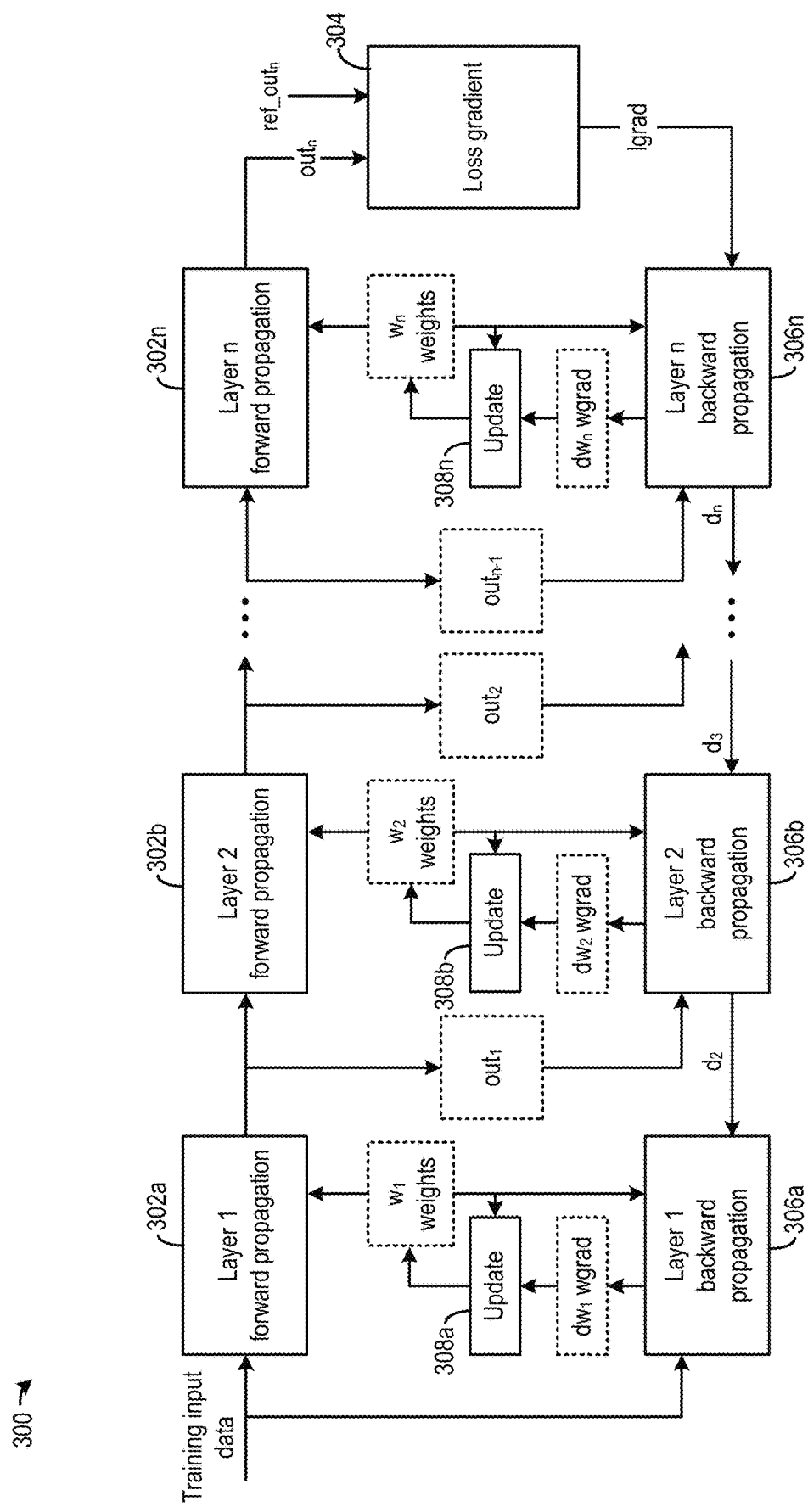
FIGS. 3A-3B illustrate examples of a training operation of a neural network and matrix transpose operations involved in the training operation.

FIG. 3A illustrates an example of a training operation 300 to train a neural network, including the neural network of prediction model 103. A training operation can be performed by, for example, a neural network hardware accelerator that implements the neural network, a general purpose hardware processor, or other suitable computing systems that support the arithmetic operations involved in neural network processing as described above. The training operation can be based on a gradient descent scheme, which includes forward propagation operations, a loss gradient operation, and backward propagation operations. Specifically, as shown in FIG. 3A, a forward propagation operation can be performed for each neural network layer, such as a forward propagation operation 302a for the lowest layer 1 (which can correspond to input layer 207 of FIG. 2A), a forward propagation operation 302a for layer 2 (which can correspond to layer 209 of FIG. 2A), a forward propagation operation 302n for the highest layer n (which can correspond to layer 211 of FIG. 2A), etc. A forward propagation operation at a neural network layer can include the multiplication and summation computations between input data and a set of weights for that layer, followed by activation function processing, as described above in Equations 1 and 2, to generate intermediate output data. The intermediate output data can then propagate to the next neural network layer as input to the forward propagation operation at that layer. For example, as shown in FIG. 3A, forward propagation operation 302a can combine training input data with $w_1$ weights of layer 1 to generate intermediate output data $out_1$, which propagate to layer 2 as input. Forward propagation operation 302b can combine data $out_1$ with $w_2$ weights of layer 2 to generate intermediate output data $out_2$, which can then propagate to the next layer. At the highest layer n, forward propagation operation 302n receive intermediate output data $out_{n-1}$ from layer n−1 (not shown in FIG. 3A), combine with $w_n$ weights of layer n, and generate intermediate output data $out_n$.

A loss gradient operation 304 can compare the intermediate output data $out_n$ of layer n against reference output data $ref\_out_n$ to generate output error gradients din. The error gradient din can measure a partial derivative of the output error, represented by the difference between $out_n$ and $ref\_out_n$, with respect to each data element of output data $out_n$. In some examples, an objective of the training is to minimize the difference between $out_n$ and $ref\_out_n$ such that the error gradients din can become close to zero.

Following the generation of loss gradients din by loss gradient operation 304, a backward propagation operation 306 can be performed for each neural network layer. For example, a backward propagation operation 306n can be performed at highest layer n, a backward propagation operation 306b can be performed at layer 2, a backward propagation operation 306a can be performed at layer 1. A backward propagation operation at a neural network layer can be based on the weights of that neural network layer, the error gradient input to that neural network layer, as well as the input to the forward propagation operation of that layer. For example, for layer n, backward propagation operation 306n can receive, as inputs, weights $w_n$, intermediate output data $out_{n-1}$ (from forward propagation operation at neural network layer n−1), and loss gradients lgrad. The backward propagation operation can perform multiplication and summation computations similar to those of Equations 1 and 2 on the inputs to generate weight gradients wgrad ($dw_n$, $dw_2$, $dw_1$, etc. in FIG. 3A) and output error gradients ($d_n$, $d_3$, $d_2$, etc. in FIG. 3A).

Weight gradients wgrad of a neural network layer can represent a partial derivative of the output error with respect to each weight of the neural network layer, and can be used to update the weights of the neural network layer. The weight gradients can be generated based on the intermediate outputs of a previous layer and the input error gradients to that neural network layer. For example, at layer n, weight gradients $dw_n$ can be generated based on the intermediate outputs $out_{n-1}$ and loss gradients lgrad, whereas at layer n−1, weight gradients $dw_{n-1}$ can be generated based on the intermediate outputs $out_{n-2}$ and output error gradients of layer n, $d_n$.

The weights at layer n can be updated by an update operation 308 (e.g., update operation 308n for layer n) based on the weight gradients $dw_n$ based on the following equation:

$$w_n' = w_n - \alpha \times dw_n \qquad \text{(Equation 4)}$$

In Equation 4, $w_n'$ can refer to the updated weights $w_n$, whereas α can include a set of pre-determined constants.

In addition, the output data gradients of a neural network layer can represent a partial derivative of the output error with respect to the product sums at the neural network layer. The output data gradients can be forwarded to the next lower neural network layer as inputs to the backward propagation operation in that layer to compute the weight gradients in that layer. For example, as described above, the output data gradients of layer n, $d_n$, can be propagated to layer n−1 to compute weight gradients $dw_{n-1}$. The output data gradients of a neural network layer can be generated based on the input data gradients to that neural network layer, as well as the original weights (prior to being updated with the weight gradients) of that neural network layer. For example, at layer n, the output data gradients $d_n$ can be generated based on weights $w_n$ as well as loss gradients lgrad in backward propagation operation 306n.

The output data gradients $d_n$ generated by layer n can then propagate to the next lower neural network layer n−1 as input to the backward propagation operation at that layer. Backward propagation operation 306b of layer 2 can operate on data gradients $d_3$, weights $w_2$, and intermediate output data $out_1$ to generate output data gradients $d_1$ as well as weight gradients $dw_2$. Weight gradients $dw_2$ can be used by update operation 308b to update $w_2$ weights based on Equation 4. Data gradients $d_2$ can propagate to layer 1. Backward propagation operation 306a of layer 1 can operate on data gradients $d_2$, weights $w_1$, and training input data to generate weight gradients $dw_1$. Weight gradients $dw_1$ can be used by update operation 308a to update $w_1$ weights based on Equation 4.

The training operation of FIG. 3A can involve matrix transpose operations of the data matrices, such as the matrices of weights $w_1$, $w_2$, ... $w_n$ as well as intermediate outputs $out_1$, $out_2$, $out_{n-1}$, etc. For example, the weight matrix of a neural network layer is combined with inputs to the neural network layer in a forward propagation operation, but in the backward propagation operation of that layer, a transposed version of the weight matrix is combined with an input error gradient matrix (received from the next layer) to compute an output error gradient matrix. For example, referring to FIG. 3A, a transposed version of the matrix of weights $w_n$ at layer n is combined with input error gradient matrix lgrad to generate output error gradient matrix $d_n$. Moreover, a transposed version of the matrix of weights $w_{n-1}$ at layer n−1 is combined with input error gradient matrix $d_n$ to generate output error gradient matrix $d_{n-1}$. The transposed version of the weight matrix is also combined with the weight gradients to adjust the weights based on Equation 4.

Figure 3B:
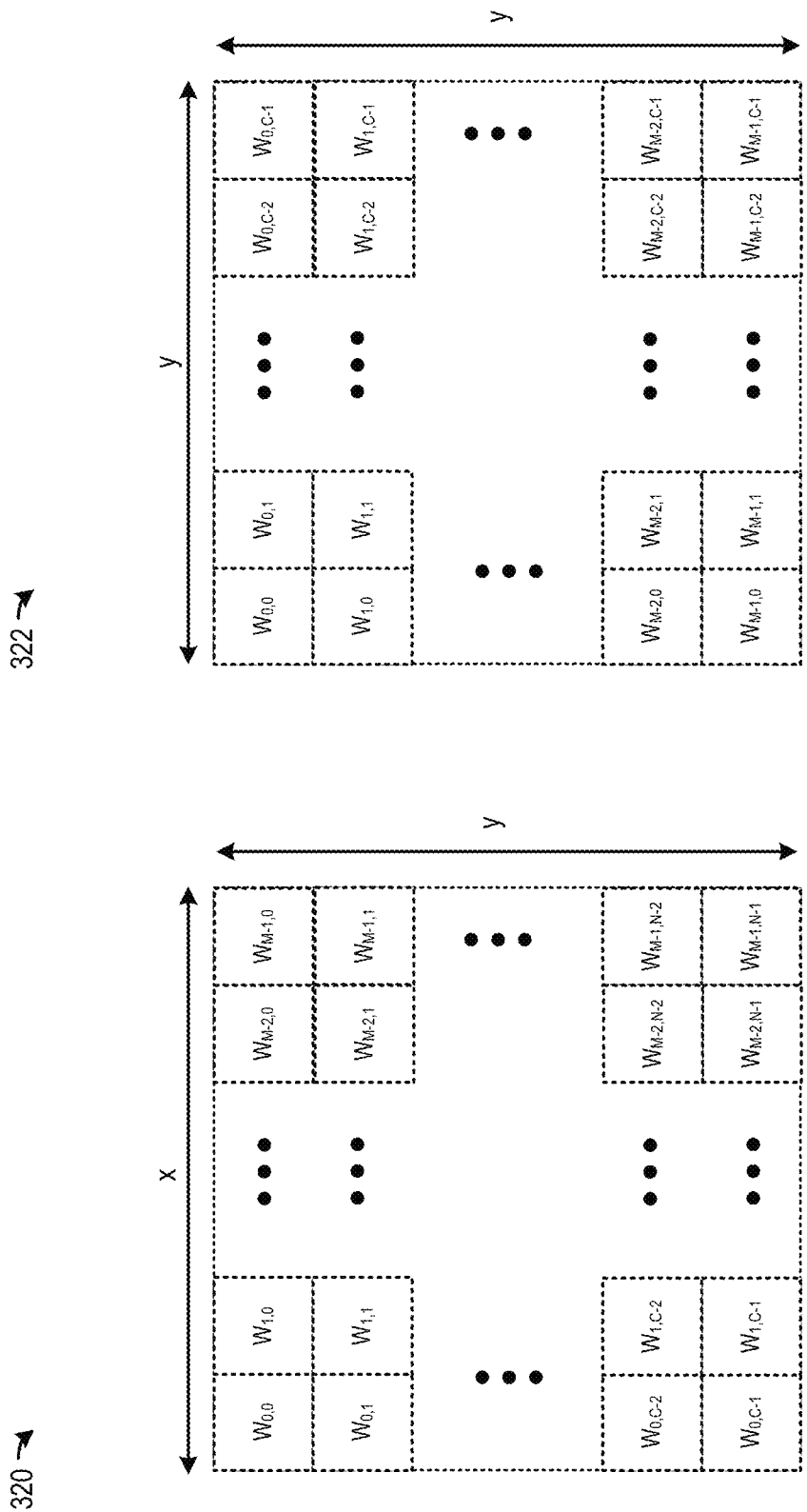

FIG. 3B illustrates an example of a transpose operation of a weigh matrix. On the left of FIG. 3B, a weight matrix 320 can be a two-dimensional matrix having a first dimension (x) and a second dimension (y). In weight matrix 320, the first dimension can correspond to a row, whereas the second dimension can correspond to a column. There can be M columns and N rows. Each weight element in weight matrix 320, $W_{x,y}$, is associated with an index in the first dimension (x) and an index in the second dimension (y). For example, $W_{1,0}$ has a matrix index of 1 in the first dimension (x) and a matrix index of 0 in the second dimension (y). Each element in matrix 320 is also stored at a memory address in a memory. In a case where a row-major addressing scheme is implemented, weight elements having consecutive indices in the x dimension in matrix 320, such as $W_{0,0}$, $W_{1,0}$, $W_{2,0}$, $W_{M-2,0}$, and $W_{M-1,0}$, which correspond to a row in matrix 320, can be stored at consecutive memory addresses.

Referring to the right of FIG. 3B, for a backward propagation, a transposed version of weight matrix 320 can be fetched by the neural network hardware accelerator as a weight matrix 322 to combine with, for example, an input error gradient matrix (e.g., lgrad, $d_n$, $d_2$, $d_1$, etc.), weight gradients ($dw_0$, $dw_1$, $dw_n$, etc.). In weight matrix 322, the matrix indices in x dimension and in y dimension are swapped with respect to weight matrix 320, such that the same entry/memory address that stores a weight data element having a pair of indices (a,b) for weight matrix 320 now stores a weight data element having a pair of indices (b,a). For example, a memory address stores $W_{0,1}$ of weight matrix 322, while the same memory address stores $W_{1,0}$ of weight matrix 320. As a result of the transpose operation, weight elements having consecutive indices in the y dimension in matrix 322, such as $W_{0,0}$, $W_{0,1}$, $W_{0,2}$, $W_{0,N-2}$, and $W_{0,N-1}$, can be stored at consecutive memory addresses.

The transpose operation of weight matrix 320 in FIG. 3B can be performed using an x-striding operation. An x-striding operation is to stride across lowest dimension elements with a certain x-striding distance so that elements in the lowest dimension (e.g., the first dimension) are store adjacent to corresponding elements in a higher dimension (e.g., the second dimension) instead to each other.

Figure 4A:
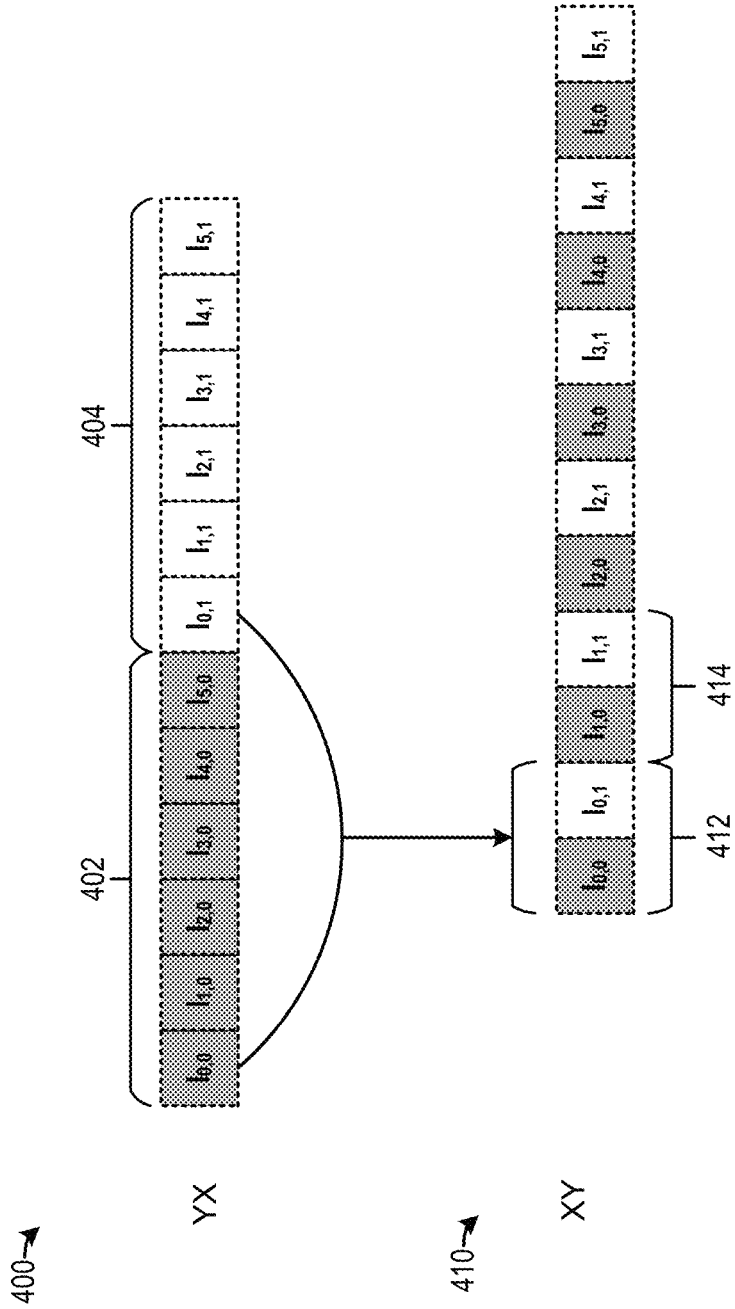

FIG. 4A illustrates an example of an x-striding operation on a two-dimensional matrix. As shown in FIG. 4A, a matrix 400 having the order of dimension YX includes a first group 402 of data elements and a second group 404 of data elements. The order of dimension YX indicates that the x-dimension is the lowest dimension such that data elements associated with consecutive x-dimension indices are stored at consecutive memory addresses, whereas the x-dimension is the highest dimension. Each group has data elements associated with consecutive indices in the x-dimension (e.g., $I_{0,0}$, $I_{1,0}$, and $I_{2,0}$ in the first group, $I_{0,1}$, $I_{1,1}$, and $I_{2,1}$ in the second group) and is stored at consecutive addresses in a memory. The label "YX" of matrix 400, with X at the rightmost, can indicate that x-dimension is the lowest dimension, and elements of consecutive indices in the x-dimension are stored at consecutive memory addresses.

To perform an x-striding operation, a data element from each of the first group and the second group can be selected and stored at consecutive addresses forming a new group, and the new groups can be assembled to form a matrix 410 having the order of dimensions XY as a transposed version of matrix 400. The order of dimension XY indicates that the y-dimension is the lowest dimension, whereas the x-dimension is the highest dimension. The selection can be based on striding across the first group and the second group based on an x-striding distance equal to the size of each group. For example, data elements $I_{0,0}$ of group 402 and $I_{0,1}$ of group 404, separated by an x-striding distance corresponding to the size of each group (6), can be selected to form a new group 412, while data elements $I_{1,0}$ of group 402 and $I_{1,1}$ of group 404 can be selected to form a new group 414. As in matrix 410 data elements having consecutive indices in the y-dimension (e.g., $I_{0,0}$ and $I_{0,1}$, $I_{1,0}$ and $I_{1,1}$), rather than in the x-dimension, are stored in consecutive addresses, matrix 410 can become a transposed version of matrix 400.

Figure 4B:
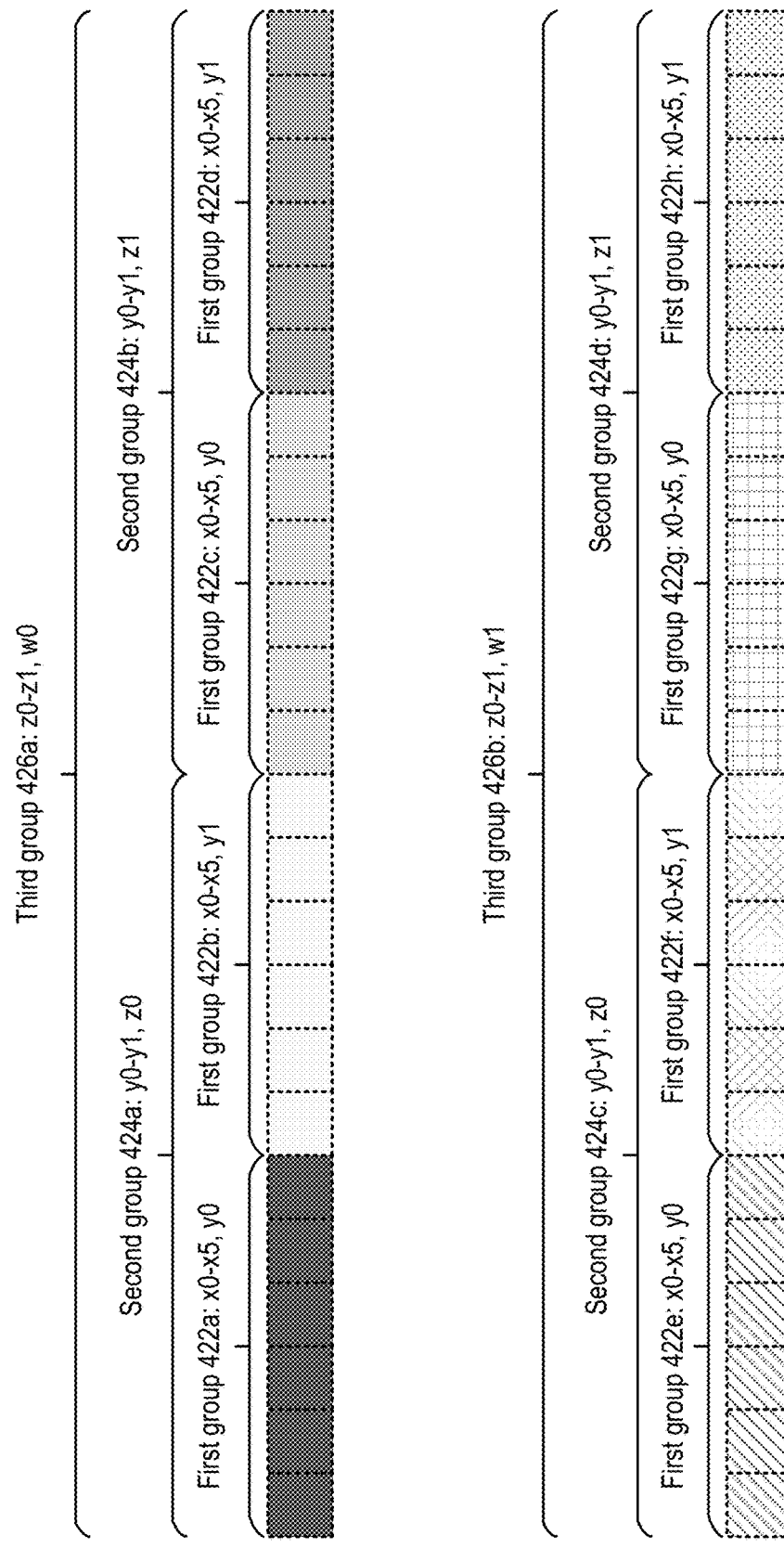

The x-striding operation of FIG. 4A can be performed on a multi-dimensional matrix having a higher number of dimensions than matrices 400, such as a 4D matrix. FIG. 4B and FIG. 4C illustrates an example x-striding operation performed on a 4D matrix 420 having the order of dimensions WZYX, such that the x-dimension is the lowest dimension, and elements associated with consecutive indices in the x-dimension are stored in consecutive memory addresses. Specifically, 4D matrix 420 includes first groups 422a, 422b, 422c, 422d, 422e, 422f, 422g, and 422h, with each first group including data elements associated with consecutive indices in the x-dimension (x0-x5), and a particular index in the y-dimension, the z-dimension, and in the w-dimension. A pair of first groups associated with consecutive indices in the y-dimension (y0, y1) can be stored adjacent to each other in the memory to form second groups 424a, 424b, 424c, and 424d, therefore the y-dimension becomes the next level dimension above the x-dimension. Moreover, a pair of second groups associated with consecutive indices in the z-dimension (z0, z1) can be stored adjacent to each other in the memory to form third groups 426a and 426b, therefore the z-dimension becomes the next level dimension above the y-dimension. Furthermore, third groups 426a and 426b can be stored adjacent to each other in the memory based on them having consecutive indices in the highest w dimension (w0, w1).

Figure 4D:
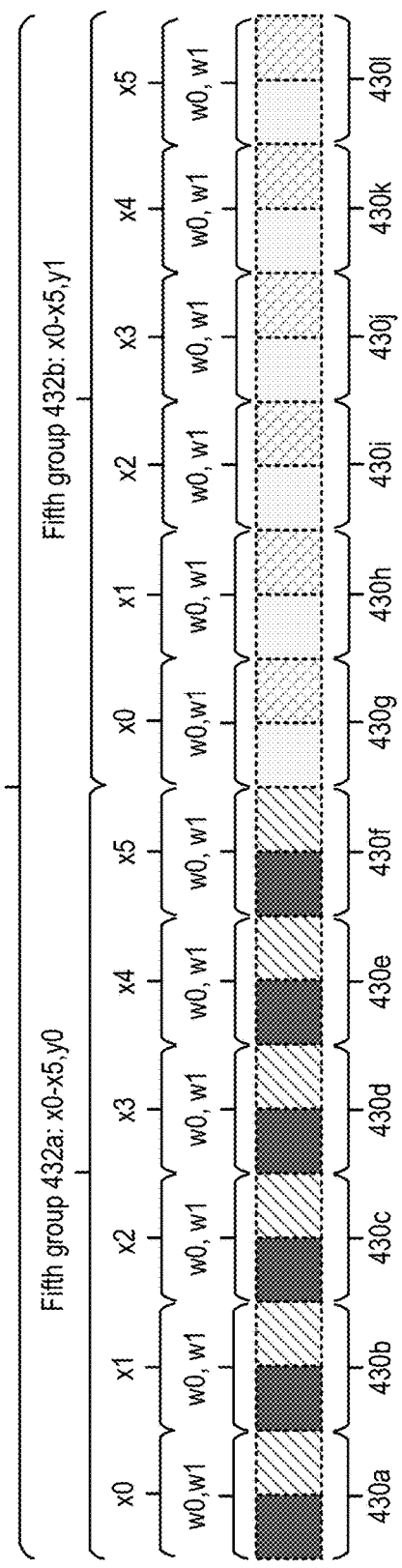
Figure 4D:
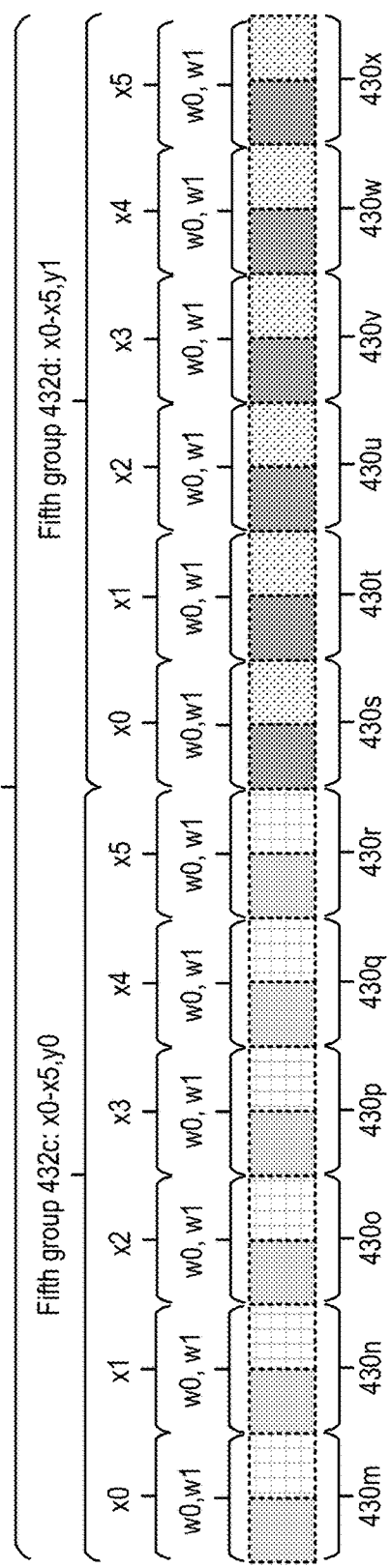

An x-striding operation can be performed on matrix 420 to change its shape. FIG. 4C and FIG. 4D illustrate an example x-striding operation to form a matrix 440 ZYXW from matrix 320 WZYX. In the x-striding operation, an x-striding operation can be performed across a stride group comprising a third group, such as third groups 426a and 426b, with an x-striding distance corresponding to the product of the sizes of the x, y, and z dimension (24). Specifically, as shown in FIG. 4C, one data element can be selected from each of third groups 426a and 426b, separated by the x-striding distance of 24, to form a new fourth group 430a. The data elements of fourth group 430a are associated with consecutive indices in the w dimension (w0, w1) and can be stored in consecutive addresses in the memory. Other data elements can be selected from third groups 426a and 426b to form, for example, fourth groups 430f, 430g, 430l, 430m, 430r, 430s, and 430x. In the example of FIG. 4B, 24 fourth groups 430, including fourth groups 430a-x, can be formed.

In addition, referring to FIG. 4D, pairs of fourth groups 430a-430f, which are formed from data elements of first groups 422a and 422e and associated with indices x0-x5 in the x-dimension and indices y0 and z0 in the y-dimension and z-dimension, can be stored adjacent to each other to form a fifth group 432a. Moreover, pairs of fourth groups 430g-430l, which are formed from data elements of first groups 422b and 422f and associated with indices x0-x5 in the x-dimension and indices y1 and z0 in the y-dimension and z-dimension, can be stored adjacent to each other to form a fifth group 432b. Further, fourth groups 430m-430r, which are formed from data elements of first groups 422c and 422g and associated with indices x0-x5 in the x-dimension and indices y0 and z1 in the y-dimension and z-dimension, can be stored adjacent to each other to form a fifth group 432c. Furthermore, pairs of fourth groups 430s-430x, which are formed from data elements of first groups 422d and 422h and associated with indices x0-x5 in the x-dimension and indices y1 and z1 in the y-dimension and z-dimension, can be stored adjacent to each other to form a fifth group 432d. Further, pairs of fifth groups 432a and 432b can be stored adjacent to each other to form a sixth group 434a, whereas fifth groups 432c and 432d can be stored adjacent to each other to form a sixth group 434b, based on each pair of fifth groups being associated with consecutive indices y0 and y1 in the y-dimension. Finally, matrix 440 can be formed by storing sixth groups 434a and 434b adjacent to each other, based on the groups being associated with consecutive indices z0 and z1 in the z-dimension. With such arrangements, matrix 440 having the order of dimensions ZYXW, in which the w-dimension is the lowest dimension, followed by the x-dimension, the y-dimension, and finally the z-dimension being the highest dimension, can be formed.

In addition to x-striding, a y-striding operation can also be performed to change the shape of the matrix. A y-striding operation is to stride across groups of data elements of consecutive indices in the first/lowest dimension (e.g., first groups 422a-h in FIG. 4C) so that first groups associated with consecutive indices in a higher dimension, rather than in the second dimension, are put adjacent each other to form new second groups. As a result of the y-striding operation, first groups having consecutive indices in a higher dimension than the second dimension (e.g., third, or fourth dimension) are stored as adjacent groups in the destination memory, which can also result in a reshaping and a transpose of the first matrix. Meanwhile, the lowest dimension is not changed, so that data elements associated with consecutive indices in the lowest dimension are still stored at consecutive memory addresses.

Figure 4E:
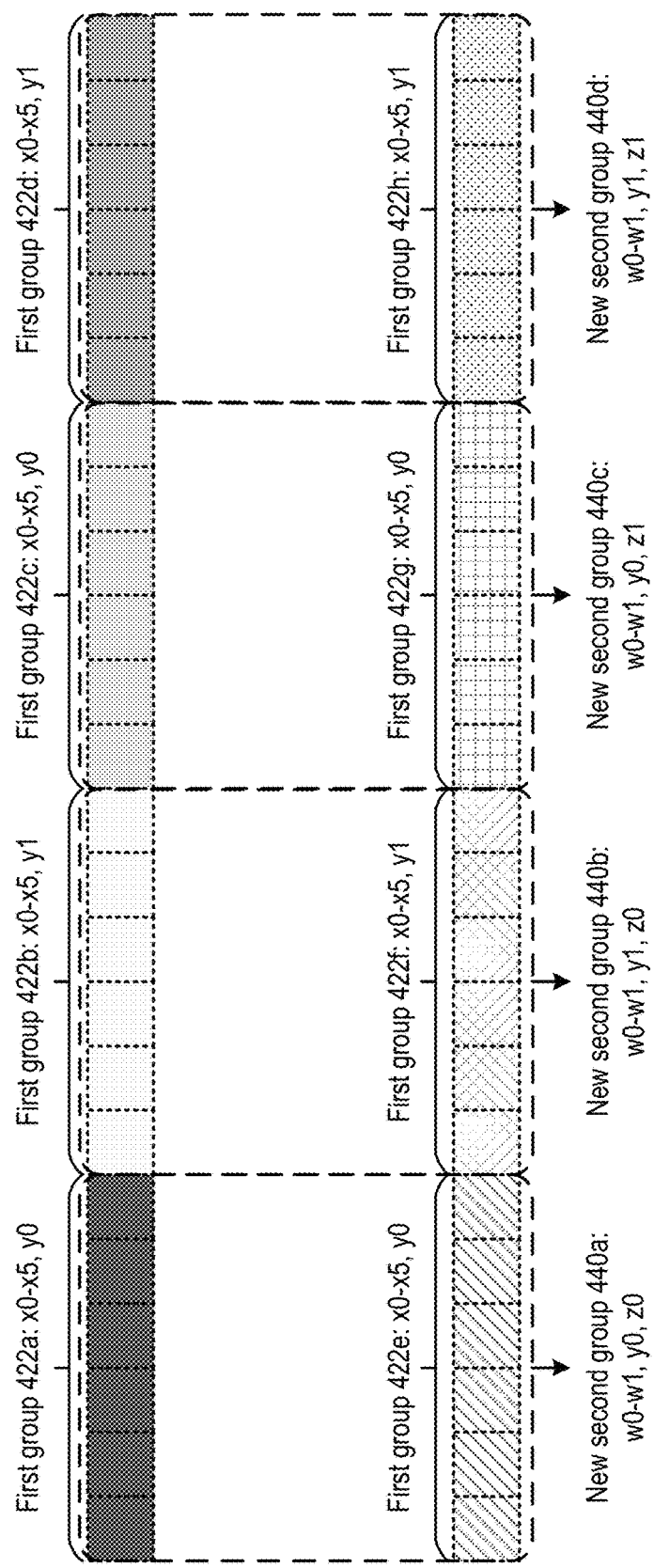
Figure 4F:
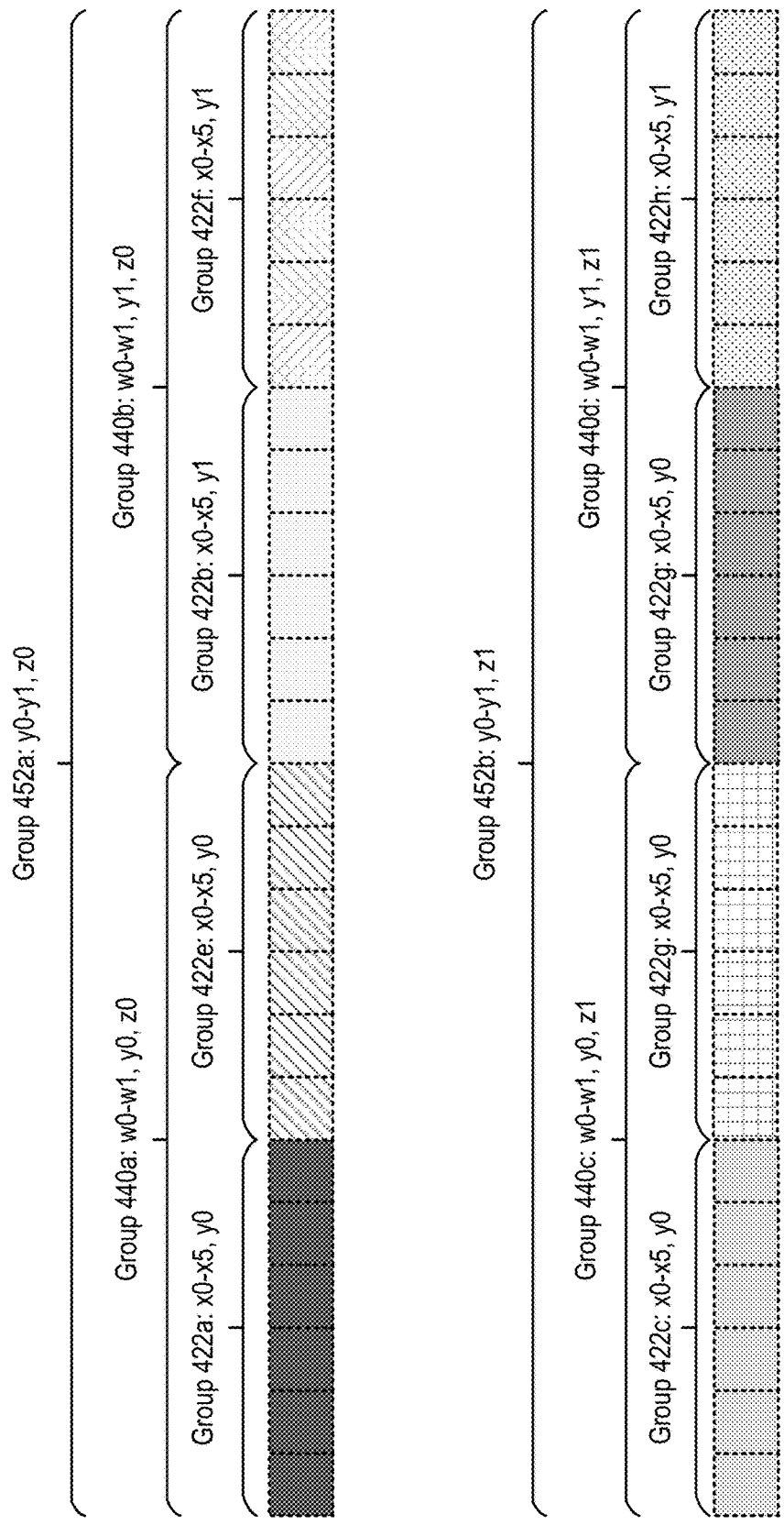

FIG. 4E and FIG. 4F illustrate examples of a y-striding operation on matrix 420. As shown in FIG. 4E, based on a y-striding distance of 4 first groups (or 24 data elements), first groups 422a and 422e can be selected to form a new second group 440a, in which first groups 422a and 422e are associated with consecutive indices in the w-dimension (w0, w1) and index y0 and index z0 in the y-dimension and the z-dimension. Moreover, first groups 422b and 422f can be selected to form a new second group 440b, in which first groups 422b and 422f are associated with consecutive indices in the w-dimension (w0, w1) and index y1 and index z0 in the y-dimension and the z-dimension. Further, first groups 422c and 422g can be selected to form a new second group 440c, in which first groups 422c and 422g are associated with consecutive indices in the w-dimension (w0, w1) and index y0 and index z1 in the y-dimension and the z-dimension, whereas first groups 422d and 422h can be selected to form a new second group 440d, in which first groups 422d and 422h are associated with consecutive indices in the w-dimension (w0, w1) and index y0 and index z1 in the y-dimension and the z-dimension.

Referring to FIG. 4F, a matrix 450 can be formed by storing new second groups 440a and 440b adjacent to each other to form a new third group 452a, in which new second groups 440a and 440b are associated with consecutive indices y0 and y1 in the y-dimension and the same index z0 in the z-dimension. Moreover, new second groups 440c and 440d can be stored adjacent to each other to form a new third group 452b, in which new second groups 440c and 440d are associated with consecutive indices y0 and y1 in the y-dimension and the same index z1 in the z-dimension. Third groups 452a and 452b are stored adjacent to each other in the memory to form matrix 450. With such arrangements, matrix 450 can have the order of dimensions ZYWX, in which the x-dimension remains the lowest dimension, the next level dimension being the w-dimension as pairs of first groups having consecutive w-dimension indices are stored adjacent to each other, followed by the y-dimension, and the highest dimension is the z-dimension.

Figure 5A:
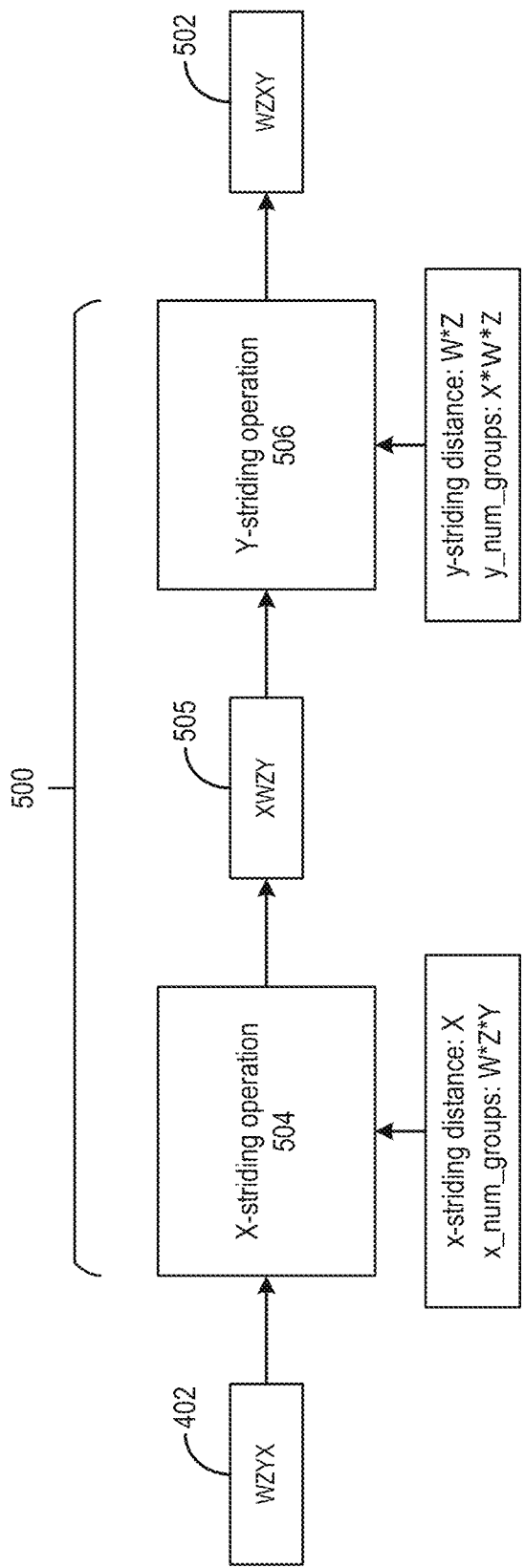
FIGS. 5A-5D illustrate other examples of matrix transpose operations supported by certain aspects of the present disclosure.

In some examples, the transpose/reshaping operation of a matrix can include a sequence of striding operations, such as a sequence of x-striding and y-striding operations, a sequence of y-striding operations, etc. FIG. 5A to FIG. 5D illustrates an example transpose operation 500 to transpose matrix 420 (with order of dimensions WZYX) to a matrix 502 having the order of dimensions WZXY, with the x-dimension and y-dimension swapped with respect to matrix 420. As shown in FIG. 5A, the transpose operation includes an x-striding operation 504 to transpose matrix 420 to an intermediate matrix 505 having order of dimensions XWZY, followed by an y-striding operation 506 to transpose intermediate matrix 505 to matrix 502.

Figure 5B:
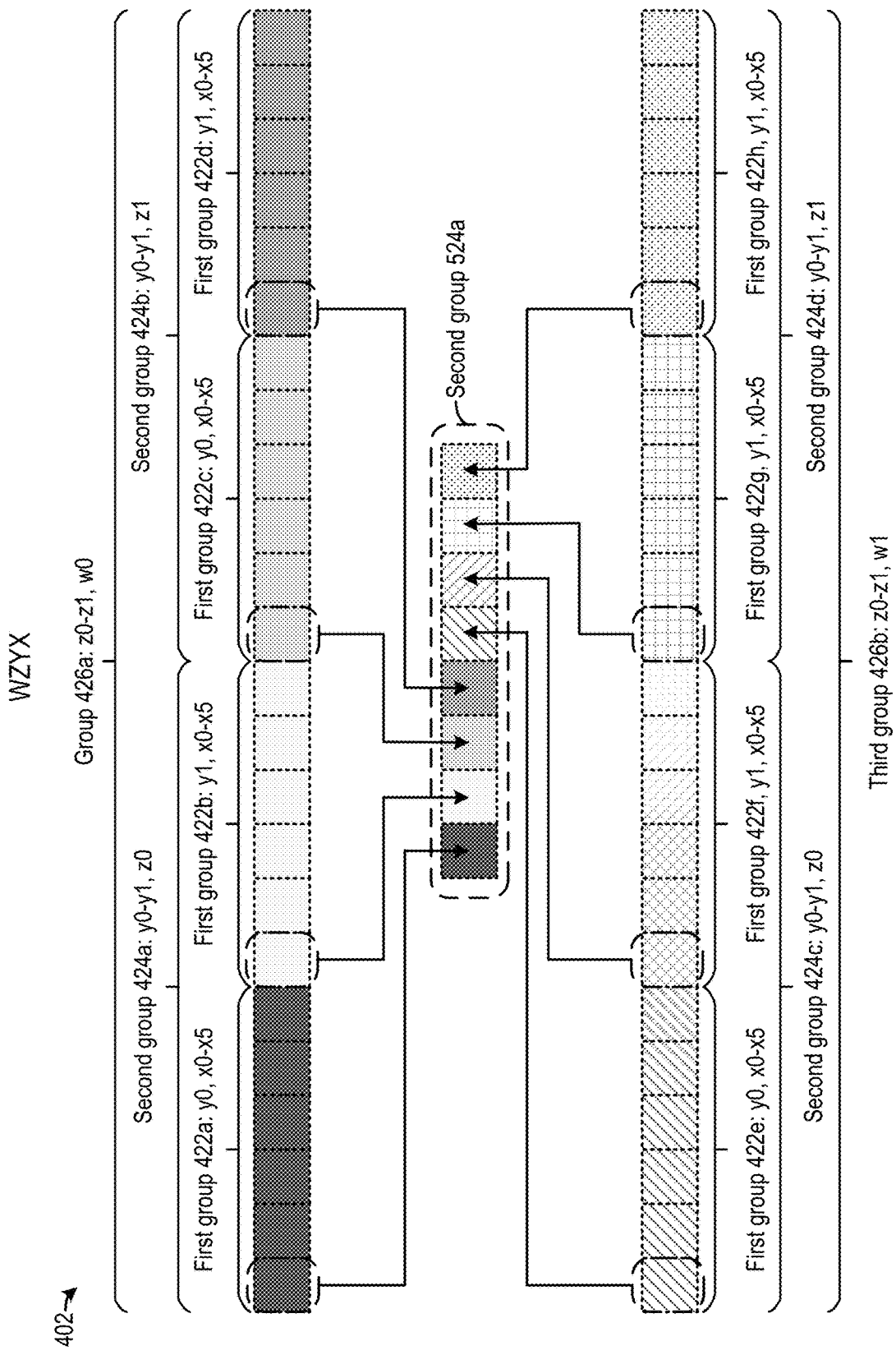

FIG. 5B illustrates an example of x-stride operation 504. The x-striding operation can be performed based on an x-striding distance of 6 (a size of the x-dimension represented "X") over a number of groups equal to 8 (a product of sizes of x-dimension, w-dimension, and z-dimension, represented by "X*W*Z"). As shown in FIG. 5B, one data element is selected from each of eight first groups 422a-422h to form a second group, such as second group 524a.

Figure 5C:
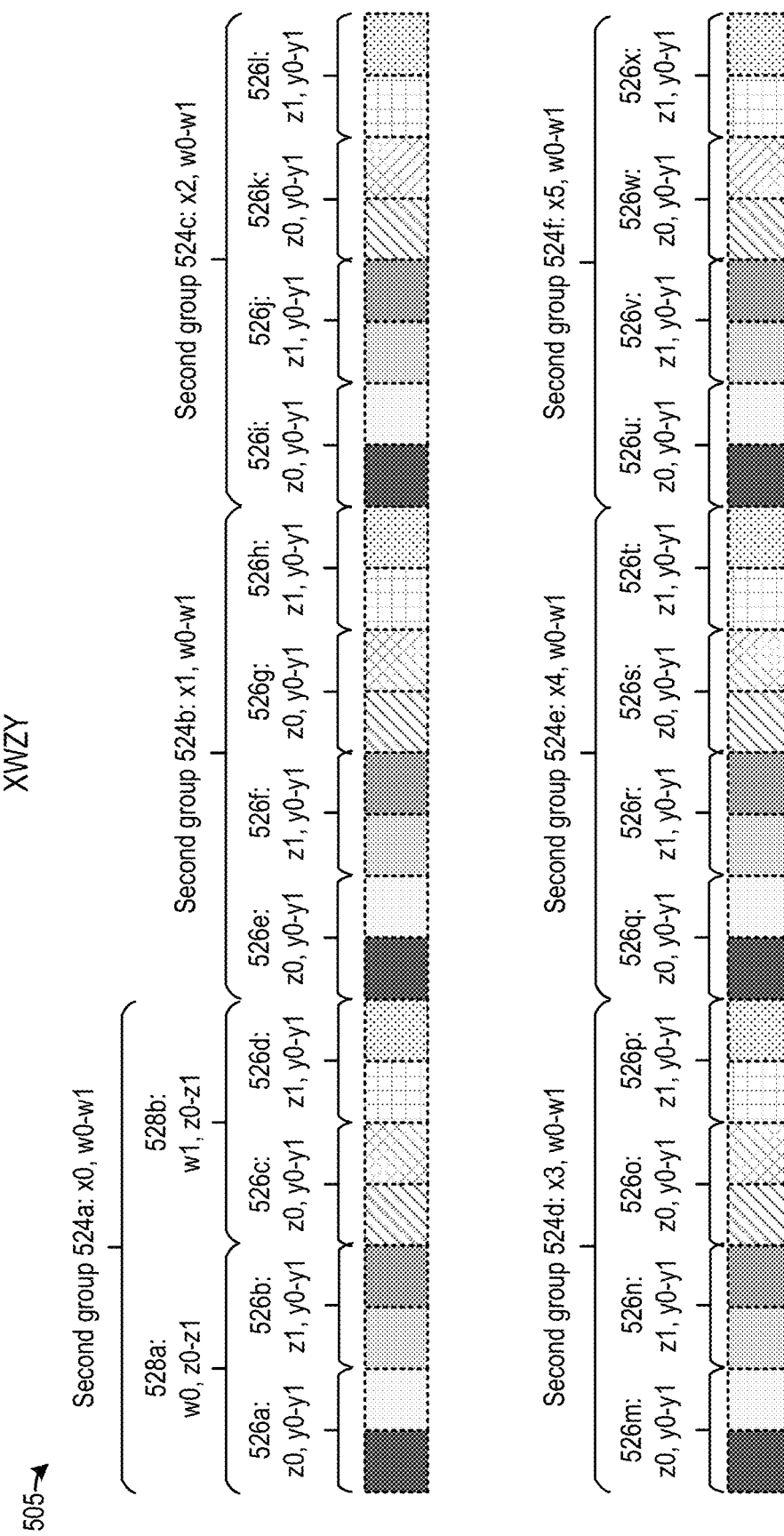

FIG. 5C illustrates an example of intermediate matrix 505. Referring to FIG. 5C, second group 524a includes subgroups 526a, 526b, 526c, and 526d each having data elements of consecutive y-dimension indices (y0, y1), and y-dimension is the lowest dimension. Moreover, subgroups 526a and 526b, associated with consecutive z-dimension indices (z0, z1), are stored adjacent to each other to form subgroup 528a, whereas subgroups 526c and 526d are stored adjacent to each other to form subgroup 528b, therefore z-dimension becomes the next level dimension above the y-dimension. Further, subgroups 528a and 528b, associated with consecutive w-dimension indices (w0, w1), are stored adjacent to each other to form second group 524a, therefore w-dimension becomes the next level dimension above the y-dimension, and second group 524a has the order of dimensions WZY. Other second groups 524 also have eight subgroups 526. For example, second group 524b includes subgroups 526e-526h, second group 524c includes subgroups 526i-526l, second group 524d includes subgroups 526m-526p, second group 524e includes subgroups 526q-526t, whereas second group 524f includes subgroups 526u-526x.

With the x-striding operation with an x-striding distance of 6, each second group includes data elements associated with a particular x-dimension index. Specifically, second group 524a is associated with x-dimension index x0, second group 524b is associated with x-dimension index x1, second group 524c is associated with x-dimension index x2, second group 524d is associated with x-dimension index x3, second group 524e is associated with x-dimension index x4, whereas second group 524f is associated with x-dimension index x5. As the second groups having consecutive x-dimension indices are stored adjacent to each other to form intermediate matrix 505, the x-dimension becomes the highest dimension, giving rise to intermediate matrix 505 having the order of dimensions XWZY.

Figure 5D:
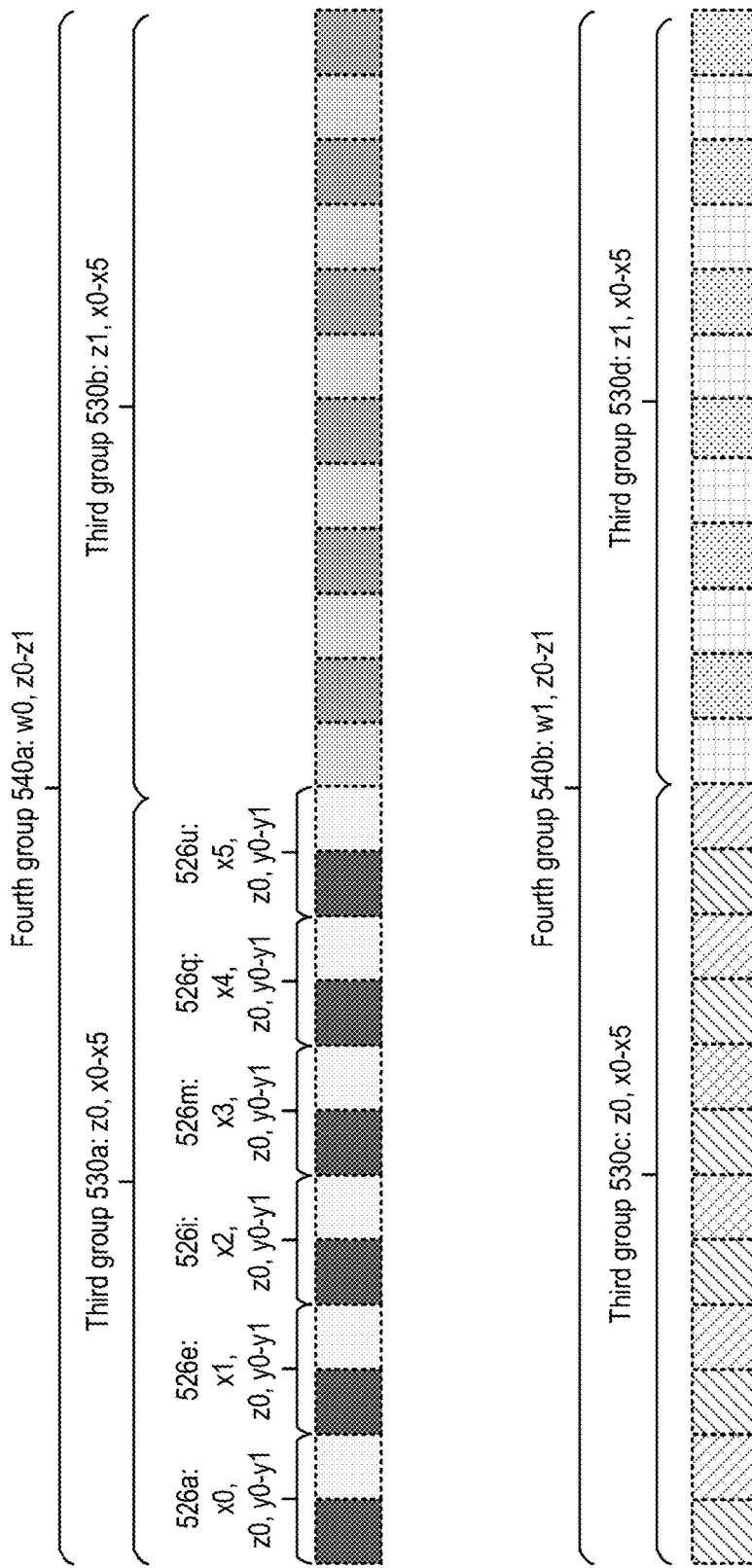

Y-striding operation 506 can then be performed to transpose intermediate matrix 505 to matrix 502. Referring back to FIG. 5A, the y-striding operation can be performed based on a y-striding distance of a multiple of the sizes of the w-dimension and the z-dimension (W*Z) and over a number of groups/subgroups equal to a multiple of the sizes of the x-dimension, the w-dimension, and the z-dimension (X*W*Z), with each group/subgroup having data elements of consecutive indices in the lowest dimension (y-dimension), to transpose a matrix having the order of dimensions XWZY to a matrix having the order of dimensions WZXY. In the example of FIG. 5C and FIG. 5D, the y-striding distance can be 4, whereas the number of stride groups (y_num_groups) equals to 24, such that the y-striding operation 506 strides across 24 subgroups 526 over a y-striding distance of 4.

With the y-striding operation, one subgroup 526 can be selected from each second group 524. Referring to FIG. 5D, pairs of subgroups 526 associated with consecutive x-dimension indices can be stored adjacent to each other in the memory to form matrix 502. For example, subgroups 526a, 526e, 526i, 526m, 526q, and 526u can be stored together in the memory to form a third group 530a which includes data elements of consecutive x-dimension indices x0-x5. In addition, pairs of third groups 530 having consecutive z-dimension indices are stored adjacent to each other in the memory. For example, third group 530a, associated with z-dimension index z0, and third group 530b, associated with z-dimension index z1, can be stored adjacent to each other to form fourth group 540a, while third groups 530c and 530d can be stored adjacent to each other to form fourth group 540b. As a result, the z-dimension can become the next level dimension above the x-dimension. Fourth groups 540a and 540b are associated with consecutive w-dimension indices w0 and w1, and they can be stored adjacent to each other, and the w-dimension can become the highest dimension above the z-dimension. As a result, matrix 502 can have the order of dimensions WZXY.

The following table illustrates the x-striding and/or y-striding operations and their configurations to transpose matrix 420 (having order of dimensions WZYX) to matrices of different orders of dimensions. In the first row, WZYX and WZXY refer to the order of the dimensions of the target matrix as explained above in FIGS. 5A-5D, an x-striding distance of X refers to an x-striding distance of the size of x-dimension (6 in the example of FIGS. 5A-5D), a y-striding distance of W*Z refers to a y-striding distance of a multiple of the size of w-dimension and the size of the z-dimension (4 groups in the example of FIGS. 5A-5D), whereas a number of groups of X*W*Z refers to a number of stride groups equal to a product of the size of X, the size of W, and the size of Z (24 in the example of FIGS. 5A-5D). The number of stride groups is also labelled as "x_num_groups" for an x-striding operation, and "y_num_groups" for a y-striding operation. The rest of the table can be interpreted based on the same convention.

TABLE 1

| | | |
|---|---|---|
| a) WZYX to WZXY | An x-striding operation to transpose WZYX to XWZY with an x-striding distance of X over a W*Z*Y number of groups (x_num_groups) A y-striding operation to transpose XWZY to WZXY with a y-striding distance of W*Z over a X*W*Z number of groups (y_num_groups) | |
| b) WZYX to WYZX | A y-striding operation to transpose WZYX to YWZX with a y-striding distance of Y over a W*Z*Y number of groups (y_num_groups) A y-striding operation to transpose YWZX to WYZX with a y-striding distance of W over a Y*W number of groups (y_num_groups) | |
| c) WZYX to WYXZ | An x-striding operation to transpose WZYX to YXWZ with an x-striding distance of Y*X over a W*Z number of groups (x_num_groups) A y-striding operation to transpose YXWZ to WYXZ with a y-striding distance of W over a Y*X*W number of groups (y_num_groups) | |
| d) WZYX to WXZY | An x-striding operation to transpose WZYX to XWZY with an x-striding distance of X over a W*Z*Y number of groups (x_num_groups) A y-striding operation to transpose XWZY to WXZY with a y-striding distance of W over a X*W number of groups (y_num_groups) | |
| e) WZYX to WXYZ | An x-striding operation to transpose WZYX to YXWZ with an x-striding distance of Y*X over a W*Z number of groups (x_num_groups) A y-striding operation to transpose YXWZ to XWYZ with a y-striding distance of X*W over a Y*X*W number of groups (y_num_groups) A y-striding operation to transpose XWYZ to WXYZ with a y-striding distance of W over a X*W number of groups (y_num_groups) | |
| f) WZYX to ZWXY | A y-striding operation to transpose WZYX to ZWYX with a y-striding distance of Z over a W*Z number of groups (y_num_groups) | |
| g) WZYX to ZWXY | An x-striding operation to transpose WZYX to XWZY with an x-striding distance of X over a W*Y*Z number of groups (x_num_groups) A y-striding operation to transpose XWZY to WZXY with a y-striding distance of W*Z over a X*W*Z number of groups (y_num_groups) A y-striding operation to transpose WZXY to ZWXY with a y-striding distance of Z over a W*Z number of groups (y_num_groups) | |

TABLE 1-continued

| | | |
|---|---|---|
| h) WZYX to ZYWX | A y-striding operation to transpose WZYX to ZYWX with a y-striding distance of Z*Y over a Z*Y*X number of groups (y_num_groups) | |
| i) WZYX to ZYXW | An x-striding operation to transpose WZYX to ZYXW with an x-striding distance of Z*Y*X over a Z*Y*X number of groups (x_num_groups) | |
| j) WZYX to ZXYW | An x-striding operation to transpose WZYX to XWZY with an x-striding distance of Z*Y*X over a W number of groups (x_num_groups) A y-striding operation to transpose XWZY to WZXY with a y-striding distance of X over a Z*Y*X number of groups (y_num_groups) A y-striding operation to transpose WZXY to ZWXY with a y-striding distance of Z over a Z*X number of groups (y_num_groups) | |
| k) WZYX to ZXWY | An x-striding operation to transpose WZYX to XWZY with a x-striding distance of X over a W*Z*Y number of groups (x_num_groups) A y-striding operation to transpose XWZY to ZXWY with a y-striding distance of Z over a X*Z*W number of groups (y_num_groups) | |
| l) WZYX to ZYXW | An x-striding operation to transpose WZYX to ZWYX with an x-striding distance of Z over a W*Z number of groups (x_num_groups) A y-striding operation to transpose ZWYX to YZWX with a y-striding distance of Y over a Z*W*Y number of groups (y_num_groups) | |
| m) WZYX to YZXW | A x-striding operation to transpose WZYX to ZYXW with a x-striding distance of Z*Y*X over a W number of groups (x_num_groups) A y-striding operation to transpose ZYXW to YZXW with a y-striding distance of Y over a Z*Y number of groups (y_num_groups) | |
| n) WZYX to YWZX | A y-striding operation to transpose WZYX to YWZX with a y-striding distance of Y over a W*Z*Y number of groups (y_num_groups) | |
| o) WZYX to YWXZ | A x-striding operation to transpose WZYX to YXWZ with an x-striding distance of Y*X over a W*Z number of groups (x_num_groups) A y-striding operation to transpose YXWZ to WYXZ with a y-striding distance of W over a Y*X*W number of groups (y_num_groups) A y-striding operation to transpose WYXZ to YWXZ with a y-striding distance of Y over a W*Y number of groups (y_num_groups) | |
| p) WZYX to YXWZ | An x-striding operation to transpose WZYX to YXWZ with an x-striding distance of Y*X over a W*Z number of groups (x_num_groups) | |
| q) WZYX to YXZW | An x-striding operation to transpose WZYX to ZYXW with an x-striding distance of Z*Y*X over a W number of groups (x_num_groups) A y-striding operation to transpose ZYXW to YXZW with a y-striding distance of Y*X over a Z*Y*X number of groups (y_num_groups) | |
| r) WZYX to XWZY: | An x-striding operation to transpose WZYX to XWZY with an x-striding distance of X over a W*Z*Y number of groups (x_num_groups) | |
| s) WZYX to XWYZ | An x-striding operation to transpose WZYX to YXWZ with an x-striding distance of Y*X over a W*Z number of groups (x_num_groups) A y-striding operation to transpose YXWZ to XWYZ with A y-striding distance of X*W over a Y*X*W number of groups (y_num_groups) | |
| t) WZYX to XZWY | An x-striding distance to transpose WZYX to XWZY with an x-striding distance of X over a W*Z*Y number of groups (x_num_groups) A y-striding operation to transpose XWZY to ZXWY with a y-striding distance of Z over a X*W*Z number of groups (y_num_groups) A y-striding operation to transpose ZXWY to XZWY with a y-striding distance of X over a Z*X number of groups (y_num_groups) | |
| u) WZYX to XZYW | An x-striding distance to transpose WZYX to ZYXW with an x-striding distance of Z*Y*X over a W number of groups (x_num_groups) A y-striding operation to transpose ZYXW to XZYW with a y-striding distance of X over a Z*Y*X number of groups (y_num_groups) | |

TABLE 1-continued

| | |
|---|---|
| v) WZYX to XYWZ | An x-striding operation to transpose WZYX to YXWZ with an x-striding distance of Y*X over a W*Z number of groups (x_num_groups)<br>A y-striding operation to transpose YXWZ to XYWZ with a y-striding distance of X over a Y*X number of groups (y_num_groups) |
| w) WZYX to XYZW | An x-striding operation to transpose WZYX to ZYXW with an x-striding distance of Z*Y*X over a W number of groups (x_num_groups)<br>A y-striding operation to transpose ZYXW to YXZW with a y-striding distance of Y*X over a Z*Y*X number of groups (y_num_groups)<br>A y-striding operation to transpose YXZW to XYZW with a y-striding distance of X over a Y*X number of groups (y_num_groups) |

Figure 6A:
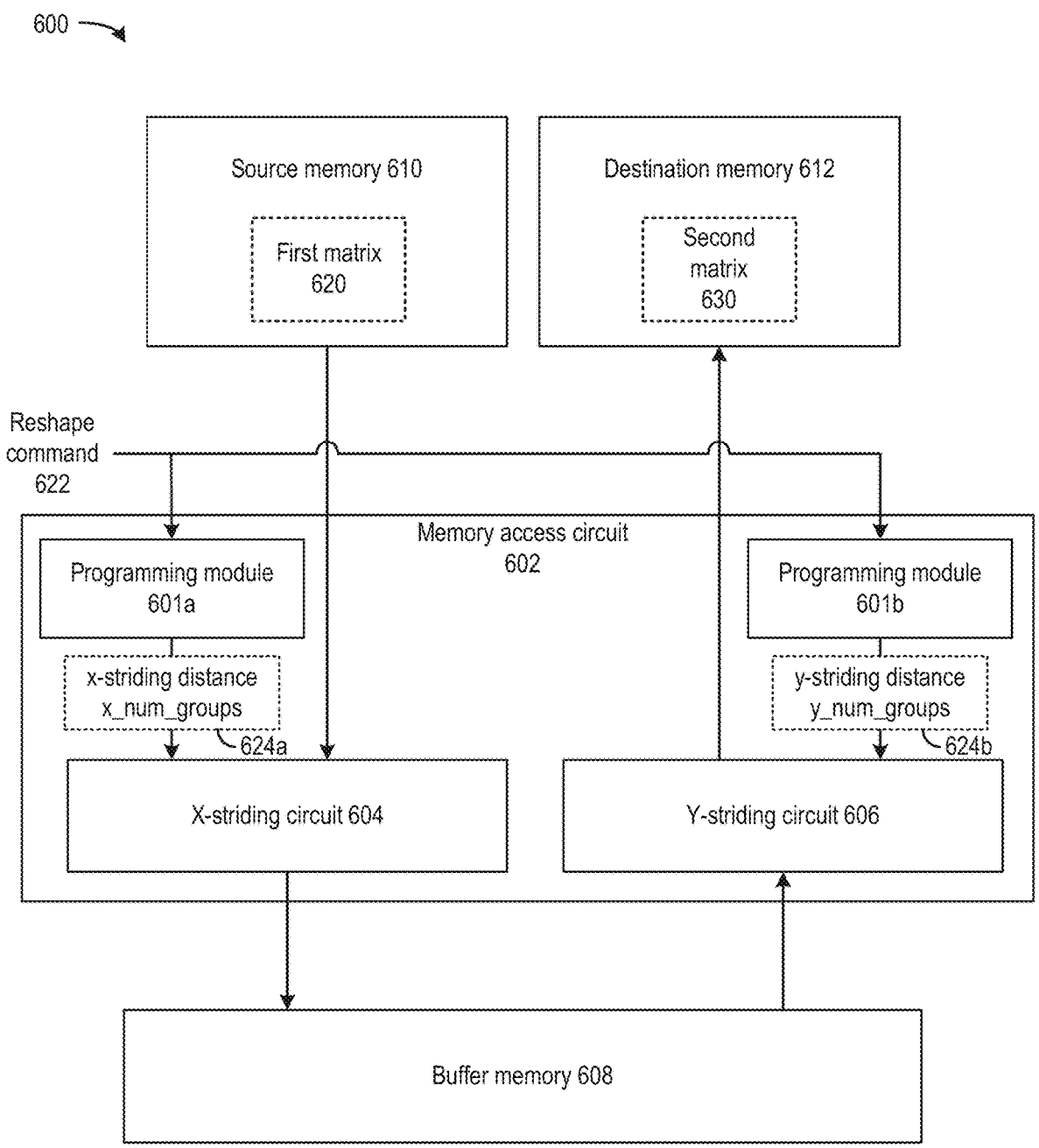
FIGS. 6A-6C illustrate an example memory system for matrix transpose operations, according to certain aspects of the present disclosure.
Figure 6B:
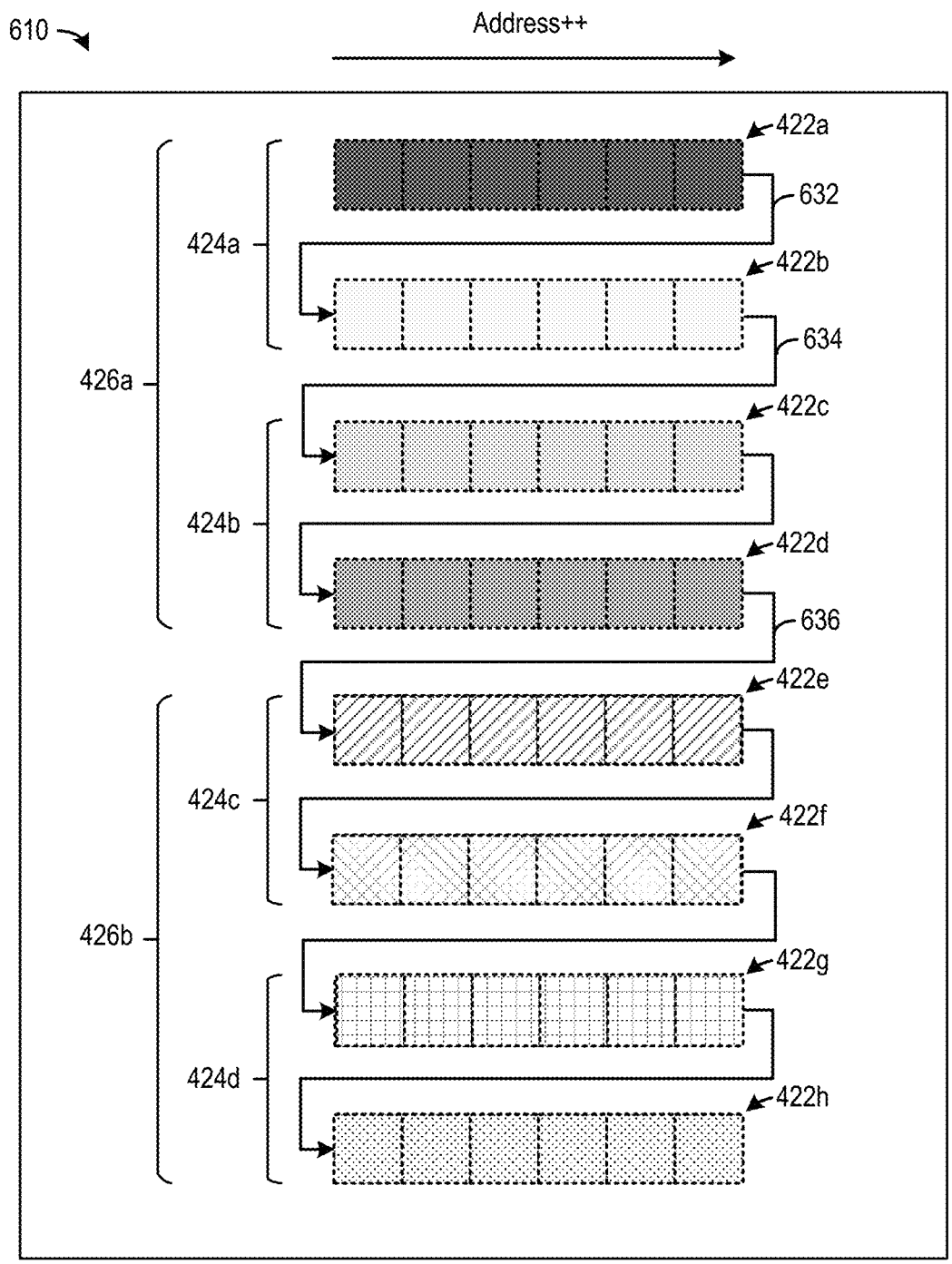

FIG. 6A and FIG. 6B illustrate an example of a memory system 600 to support the aforementioned x-striding and y-striding operations. As shown in FIG. 6A, memory system 600 includes a memory access circuit 602, which includes a programming module 601a, a programming module 601b, an x-striding circuit 604, and a y-striding circuit 606, and a buffer memory 608. Memory system 600 can be part of a neural network accelerator and buffer memory 608 can be an on-chip memory such as an SRAM memory. Memory system 600 can interface with a source memory 610 and a destination memory 612 which can be external or internal to the neural network accelerator. Source memory 610 and destination memory 612 can include DRAM devices, SRAM devices, HBM devices. Source memory 610 can store a first matrix 620. Memory access circuit 602 can perform read and write operation at buffer memory 608 to implement an x-striding operation, a y-striding operation, or any combination thereof, to transpose first matrix 620 to a second matrix 630, and to store second matrix 630 at destination memory 612.

Specifically, first matrix 620 can be multi-dimensional, with each data elements associated with indices in a first dimension, a second dimension, a third dimension, a fourth dimension, etc. First matrix 620 can be, for example, matrix 420 of FIG. 4B having the order of dimensions WZYX. The first dimension can be of the lowest dimension, followed by the second dimension, the third dimension, while the fourth dimensions can be of the highest. FIG. 6B illustrates an example of a memory address arrangement of first matrix 620 in source memory 610. As shown in FIG. 6B, data elements associated with consecutive indices in the first dimension (e.g., x-dimension) can be stored at a range of consecutive addresses at the source memory to form first groups, including first groups 422a, 422b, 422c, 422d, 422e, 422f, 422g, 422h, etc., of FIG. 4A. Pairs of the first groups associated with consecutive indices in the second dimension (e.g., the y-dimension) can be stored adjacent to each other at the source memory to form a second group, such as second groups 424a, 424b, 424c, and 424d of FIG. 4A. Storing a pair of first groups adjacent to each other can include, for example, storing the pair of first groups in contiguous memory regions of source memory 610, or storing a pointer, such as pointer 632, to indicate the pair of first groups are adjacent to each other. The second groups associated with consecutive indices in the third dimension (e.g., the z-dimension) can be stored adjacent to each other at the source memory to form a third group, including third groups 426a and 426b. Storing a pair of second groups adjacent to each other can include, for example, storing the pair of second groups in contiguous memory regions of source memory 610, or storing a pointer, such as pointer 634, to indicate the pair of second groups are adjacent to each other. Finally, the third groups associated with consecutive indices in the fourth dimension (e.g., the w-dimension) can be stored adjacent to each other at the source memory, which can be indicated by, for example, pointer 636. Second matrix 630 can be stored at destination memory 612 following the same memory address arrangement in FIG. 6B.

Figure 6C:
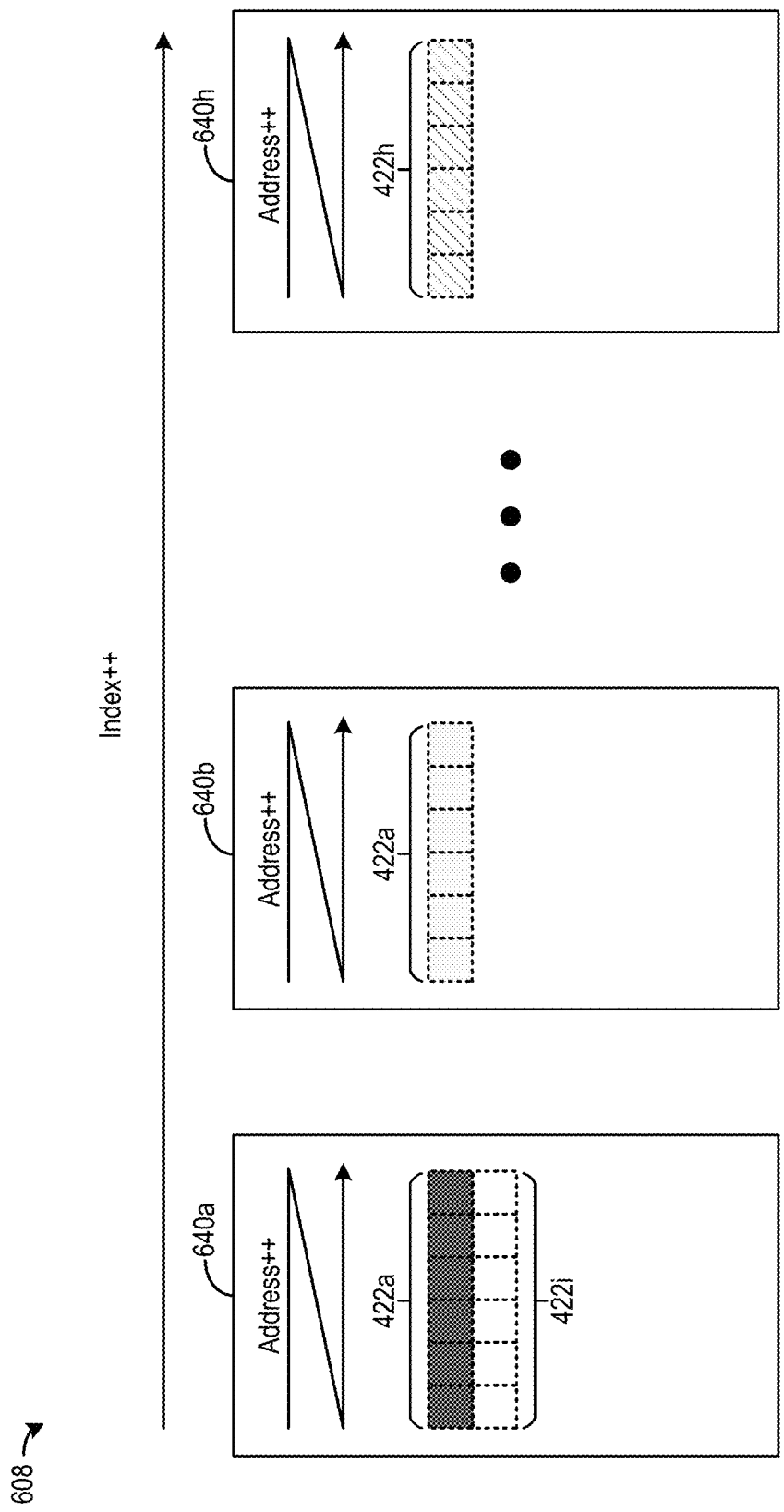

FIG. 6C illustrates example components of buffer memory 608. As shown in FIG. 6C, buffer memory 608 can include a plurality of memory banks including memory bank 640a, 640b, 640n, etc. Each memory bank can be a stand-alone memory array, or can represent a memory region in a memory array. Each memory bank can be associated with an index. In a case where no x-striding operation and no y-striding operation is performed, each first group comprising data elements associated with consecutive indices in the lowest dimension (e.g., the x-dimension) can be stored in consecutive memory addresses within a memory bank. For example, first group 422a can be stored at consecutive memory addresses within memory bank 640a, first group 422b can be stored at consecutive memory addresses within memory bank 640b, whereas first group 422h can be stored at consecutive memory addresses within memory bank 640h.

A pair of first groups that are adjacent to each other can be stored in memory banks of consecutive indices. For example, first group 422a can be stored in memory bank 640a associated with an index of 1, whereas first group 422b can be stored in memory bank 640b associated with an index of 2. First groups can be fetched following the order of the indices of the memory banks, starting with the index of 1 and followed by the indices of 2, 3, 4, etc. First groups fetched from memory banks 640 of consecutive indices can then be stored as adjacent groups in destination memory 612, as shown in FIG. 6A.

In some cases, the number of first groups may exceed the number of the memory banks 640a. For example, in the example of FIG. 4D, there can be 24 first groups to be stored in eight memory banks. In such a case, the first groups can be assigned to the memory banks in a round-robin fashion. The first groups 422a-422h can be stored at memory banks of starting at index 0 and ending at index 7, with first group 422a stored at memory bank of index 0. The first groups 422i-422p can also be stored at the same set of memory banks, with first group 422i also stored at memory bank of index 0. To fetch the first groups, the first eight groups (first groups 422a-422h) can be read from the memory banks by traversing indices 0-7, followed by the second eight groups (first groups 422i-422p).

As described above, memory access circuit 602 can read and write operation at buffer memory 608 to implement an x-striding operation, a y-striding operation, or any combination thereof, to transpose first matrix 620. Specifically, programming modules 610a and 610b can receive a matrix reshape command 622, which can be part of an instruction set involving matrix computations (e.g., instructions for a neural network hardware accelerator). Matrix reshape command 622 may specify, for example, which of the matrix reshaping operation of Table 1 above to be performed by memory access circuit. Each of programming modules 601a and 601b may store a mapping table that maps each matrix reshaping operation and one or more x-striding and/or y-striding operations to be performed for each matrix reshaping operation as described in Table 1. The mapping table may also stores the x-striding distance and x_num_group parameters of the x-striding operation and the y-striding distance and y_num_group parameters for the y-striding operations. In a case where an x-striding operation is not be performed, the x-striding distance can set to one. Likewise, in a case where a y-striding operation is not to be performed, the y-striding distance can also be set to one. Based on the mapping table and matrix reshaping command 622, programming module 601a can generate programming information 624a specifying the x-striding distance and x_num_groups parameters for x-striding circuit 604, whereas programming module 601b can generate programming information 624b specifying the y-striding distance and y_num_groups parameters for y-striding circuit 606.

The x-striding circuit 604 can be configured, based on programming information 624a, the first groups of data elements (data elements associated with consecutive indices in the lowest dimension), and store each first group at a pattern of write addresses at the buffer memory. The pattern of write addresses can be defined based on whether a non-x-striding operation or an x-striding operation is to be performed, and an x-striding distance, all of which can be defined according to programming information 624a. Specifically, in a case where programming information 624a indicate that x-striding is disabled (based on an x-striding distance of one), x-striding circuit 604 can perform a non-x-striding operation and store each first group at consecutive addresses at buffer memory 608. For example, based on the x_num_groups parameter in programming information 624a, x-striding circuit 604 can determine there are 24 stride groups, such that each stride group corresponds to a first group of matrix 620, and determine that each stride group comprises the first group which includes 6 data elements. X-striding circuit 604 can then fetch 6 data elements from 6 consecutive memory addresses for a first group (e.g., first group 422a), store the first group at consecutive memory addresses at a memory bank (e.g., memory bank 640a), and then fetch the next 6 data elements for another first group and store that first group at the next memory bank (e.g., memory bank 640b), until the 24 first groups are fetched, as described in FIG. 6C.

Figure 7A:
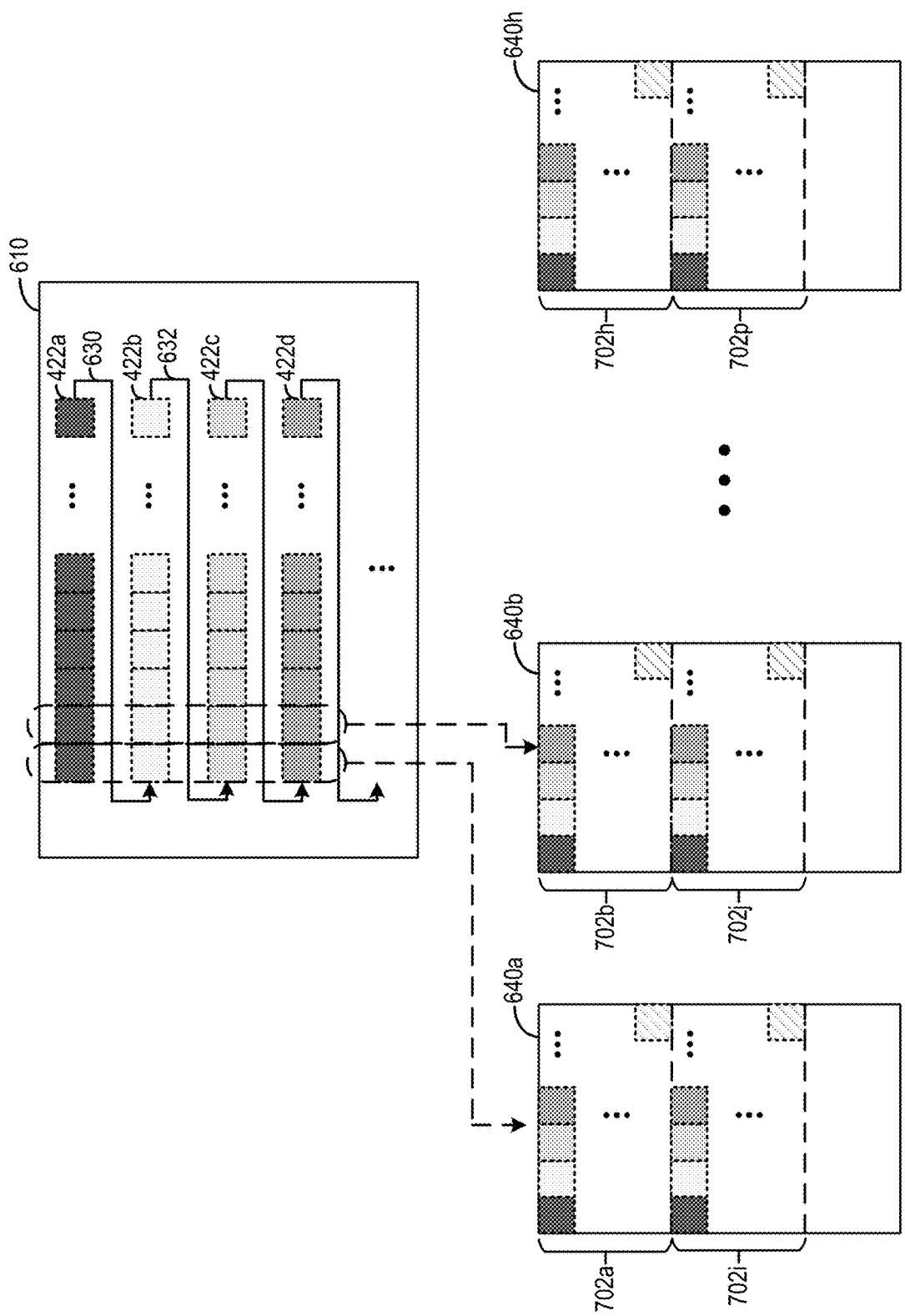
FIGS. 7A-7C illustrate example operations of the memory system of FIGS. 6A-6C to support a matrix transpose operation, according to certain aspects of the present disclosure.

On the other hand, in a case where programming information 624a indicate that x-striding is enabled, x-striding circuit 604 can perform an x-striding operation with an x-striding distance over a number of the first groups, based on the x-striding distance and x_num_groups parameters in programming information 624a. FIG. 7A illustrates an example of x-striding operation to be performed by x-striding circuit 604. As shown in FIG. 7A, x-striding circuit 604 can stride, based on the x-striding distance equal to a size of each first group, across each first group including first groups 422a, 422b, 422c, 422d, etc. of FIG. 5B, select corresponding data elements having the same index in the first dimension (the lowest dimension) from each first group. In a case where the x-striding distance exceeds the first group, x-striding circuit 604 can stride across each second group (e.g., second groups 424a-424d of FIG. 5B), each third group (e.g., third groups 426a-426b of FIG. 5B), to select a corresponding data element from each second group/third group, based on the pointer information (e.g., pointers 632, 634, and 636) that identify pairs of adjacent first groups, second groups, and third groups. X-striding circuit 604 can then store the corresponding data elements at consecutive addresses at each memory bank to form a new first group For example, as shown in FIG. 7A, x-striding circuit 604 can fetch the first data elements at the starting address at first group, and store the data elements at consecutive addresses at memory bank 640a to form a new first group 702a. The x-striding circuit 604 can then fetch the second data elements at the next address at each group, and store the data elements at consecutive addresses at memory bank 640b to form a new first group 702b. The x-striding circuit 604 can store additional new first groups at other memory banks, such as new first group 702h, in a round robin fashion as described above. For example, in a case where there are eight memory banks and each first group at source memory 610 includes more than eight data elements, x-striding circuit 604 can fetch the ninth data elements from each first group and store the elements as a new first group 702i at memory bank 640a. New first group 702i can be stored at an address offset from new first group 702a based on the size of the new first group, which equals to the number of groups to stride across as specified by the x_num_groups parameter. Likewise, new first group 702j can be stored at memory bank 640b with new first group 702b, whereas new first group 702p can be stored at memory bank 640h with new first group 702h.

Referring back to FIG. 6A, after x-striding circuit 604 stores data elements of first matrix 620 at memory banks 640 of buffer memory 608 (based on either an x-striding operation or a non-x-striding operation), y-striding circuit 606 can fetch each first group, or each new first group, from buffer memory 608, and store the first groups at the destination memory 612 to form a second matrix. The fetching of the first groups can follow a memory read address pattern to perform a non-y-striding operation, or to perform a y-striding operation, based on the y-striding distance and y_num_groups parameters in programming information 624b.

Figure 7B:
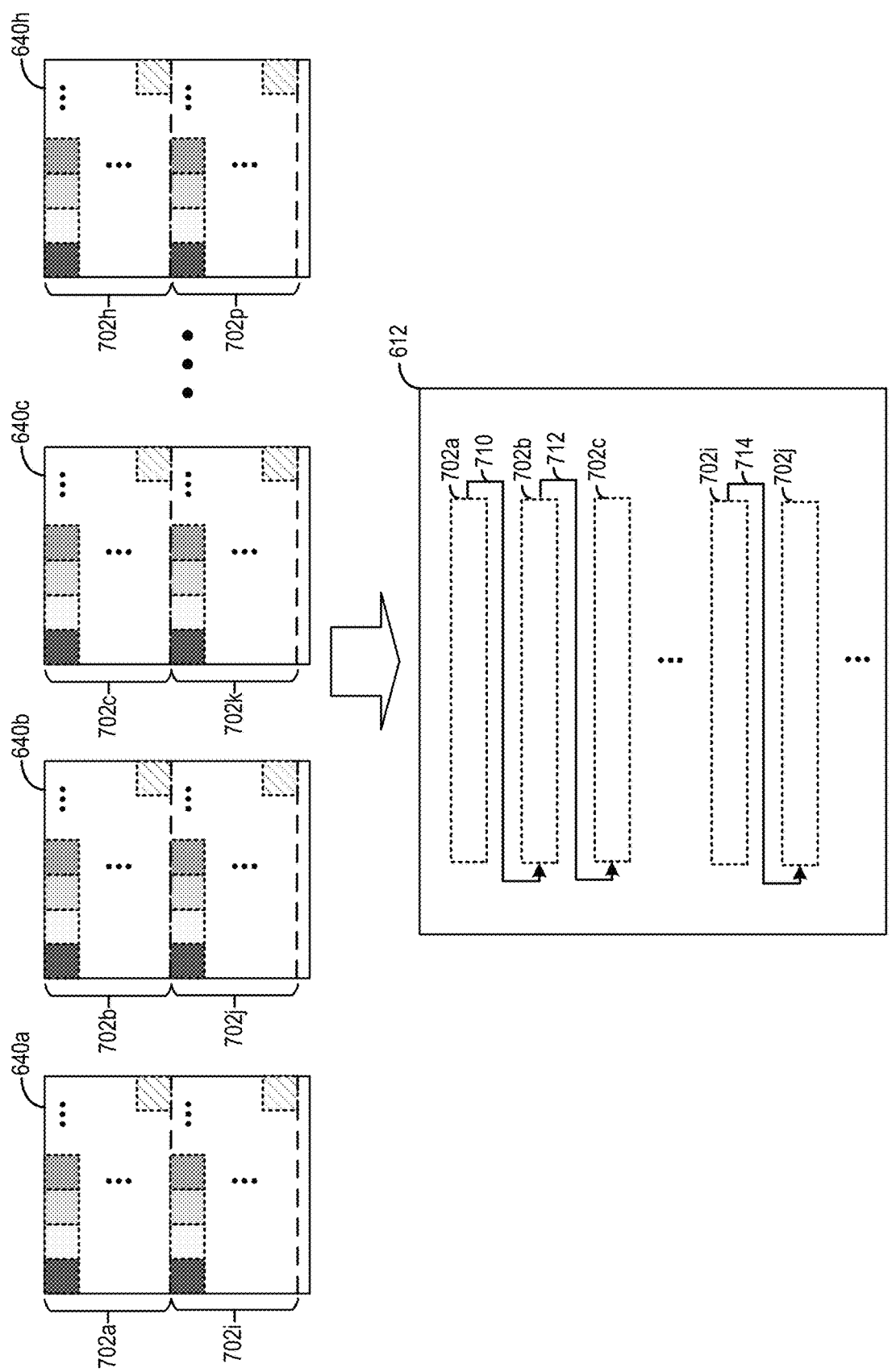
Figure 7C:
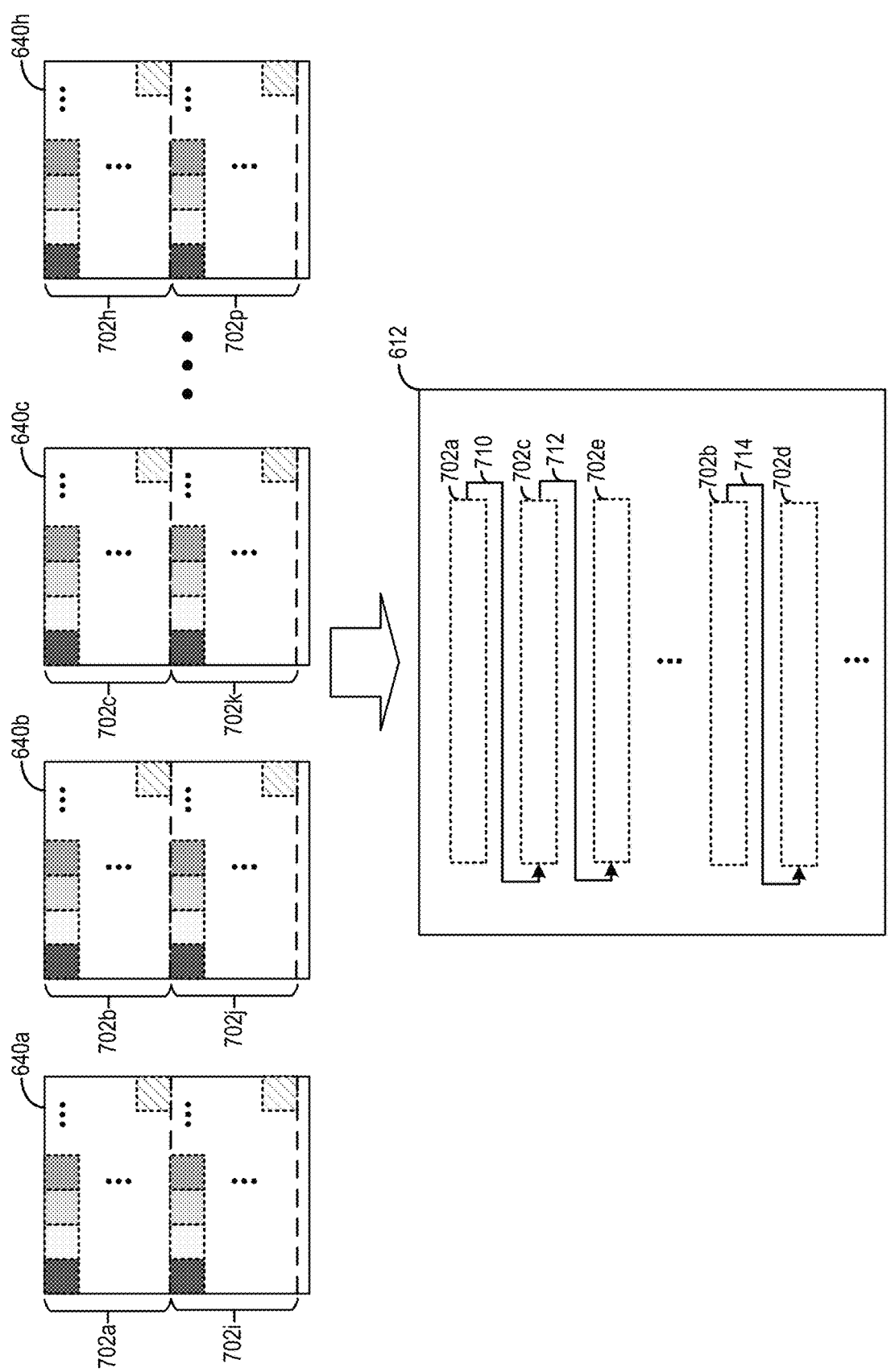

FIG. 7B and FIG. 7C illustrate examples of non-y-striding and y-striding operations to be performed by y-striding circuit 606. FIG. 7B illustrates an example of a non-y-striding operation. As shown in FIG. 7B, y-striding circuit 606 can identify a first group from each memory bank based on the y_num_groups parameter of programming information 624b which can specify the number of data elements in a first group, fetch adjacent first groups from adjacent memory banks 640 (memory banks of consecutive indices), and store the adjacent first groups as adjacent groups at destination memory 612. For example, in a first iteration, y-striding circuit 606 can fetch first group 702a from memory bank 640a, first group 702b from memory bank 640b, first group 702c from memory bank 640c, up to first group 702h from memory bank 640h, and store these first groups as adjacent groups at destination memory 612. In a second iteration, y-striding circuit 606 can then fetch first group 702i from memory bank 640a, first group 702j from memory bank 640b, first group 702k from memory bank 640c, up to first group 702p from memory bank 640h, and store these first groups as adjacent groups in memory 612, with first group 702i also being adjacent to first group 702h. In destination memory 612, the indications of groups being adjacent to each other can be based on, for example, pointers 710 and 712, and/or these groups being stored in contiguous memory regions of destination memory 612, as described above.

FIG. 7C illustrates an example of a y-striding operation. As in FIG. 7B, y-striding circuit 606 can identify a first group from each memory bank based on the y_num_groups parameter which can specify the number of data elements in a first group. But instead of fetching adjacent first groups in each iteration, y-striding circuit 606 can stride across the first groups with a certain y-striding distance so that first groups associated with consecutive indices in a higher dimension, rather than in the second dimension, are put adjacent each other to form new second groups. Specifically, to perform a y-striding operation, y-striding circuit 606 can fetch a pair of first groups from non-neighboring memory banks by skipping a number of memory banks based on the y-striding distance, and store the pair of first groups as adjacent first groups in the destination memory. For example, in FIG. 7C, with a y-striding distance of 2, in a first iteration y-striding circuit 606 can fetch first groups 702*a*, 702*c*, 702*e*, etc. by skipping every other memory bank, and store first groups 702*a*, 702*c*, 702*e*, etc., as adjacent first groups at destination memory 612. In a second iteration, y-striding circuit 606 can fetch first groups 702*b*, 702*d*, etc. by skipping every other memory bank, and store first groups 702*b* and 702*d* as adjacent first groups at destination memory 612, to form second matrix 630. As a result of the y-striding operation, first groups having consecutive indices in a higher dimension than the second dimension (e.g., third, or fourth dimension) are stored as adjacent groups in the destination memory, which can also result in a reshaping and a transpose of first matrix 620 into second matrix 630.

Figure 8:
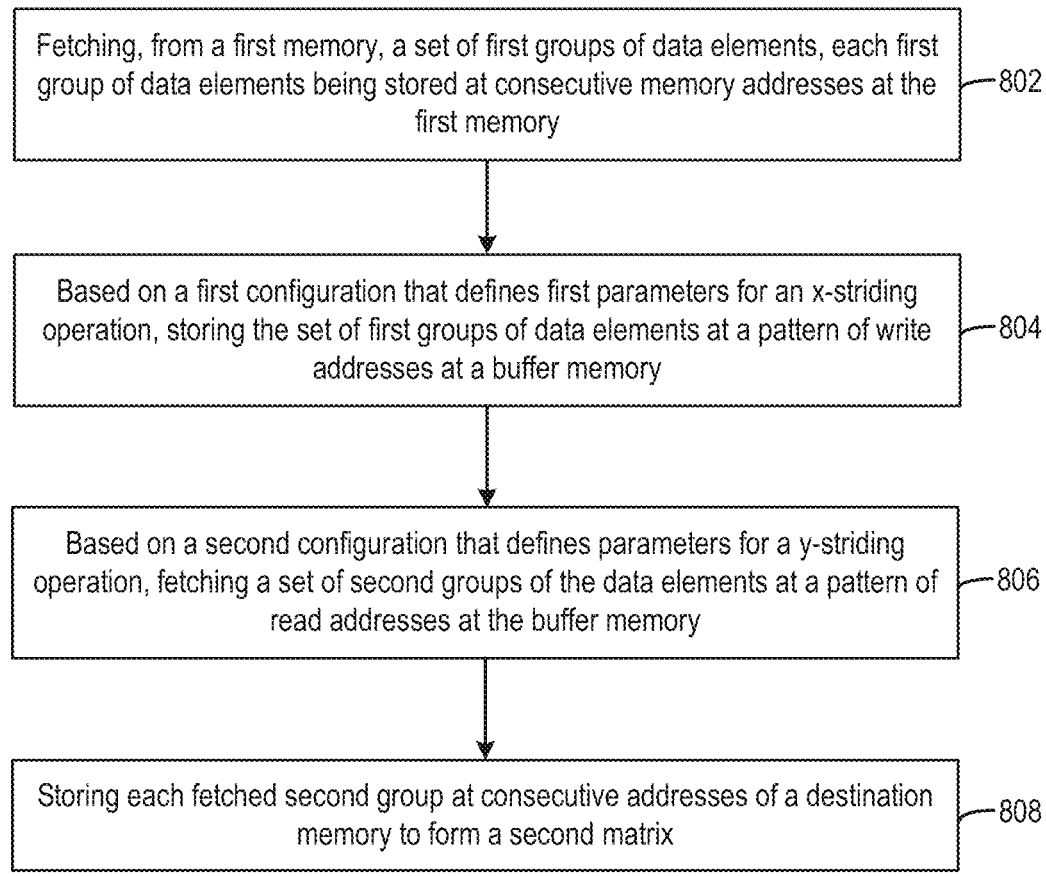
FIG. 8 illustrates an example of a flow chart of a matrix transpose operation, according to certain aspects of the present disclosure.

FIG. 8 illustrates a flow chart of a method 800. Method 800 can be performed by, for example, memory system 600 comprising memory access circuit 602 and buffer memory 608 to perform a transpose operation of a matrix. In some examples, memory system 600 can be part of a neural network hardware accelerator, and method 800 can be performed to transpose a matrix to support a neural network computation operation at the neural network hardware accelerator (e.g., a training operation, or an inferencing operation).

In operation 802, x-striding circuit 604 fetches, from a first memory (e.g., source memory 610), a set of first groups of data elements of a first matrix, each first group of data elements being stored at consecutive memory addresses at the first memory. An example of first matrix is matrix 420 as shown in FIG. 4B, which can include first groups 422*a*-422*h* each including data elements associated with consecutive indices in the lowest dimension (e.g., x-dimension) and stored at consecutive addresses at the source memory.

In operation 804, based on a first configuration that defines first parameters for an x-striding operation, x-striding circuit 604 stores the data elements of each first group at a pattern of write addresses at the buffer memory.

Specifically, the first parameters can include an indication of whether to perform an x-striding operation, a first number of the first groups to be stridden by the x-striding operation, and an x-striding distance. In a case where the first parameters indicate no x-striding operation is to be performed, the pattern of write addresses can include consecutive addresses at the buffer memory to store the data elements of a first group. In some examples, the buffer memory can include a plurality of memory banks, and the data elements of the first group can be stored at consecutive addresses at a memory bank, and each memory bank can store the data elements of each first group. The x-striding circuit 604 can identify each first group based on the first number of the first groups defined in the first parameters, and store the data elements of each first group at each memory bank.

On the other hand, in a case where the first parameters indicate an x-striding operation is to be performed, the pattern of write addresses can include non-consecutive addresses, such as addresses at different memory banks to store the data elements of a first group, such that the data elements of the first group is distributed across the memory banks. The x-striding circuit 604 can identify a first data element from each first group based on the x-striding distance, and store the first data elements at consecutive addresses at a first memory bank to form a first one of a second group. The x-striding circuit 604 can identify a second data element from each first group based on the x-striding distance, and store the second data elements at consecutive addresses at a second memory bank to form a second one of a second group. As data elements associated with consecutive indices at a higher dimension, other than the lowest dimension in the first matrix, are stored at consecutive addresses, the first matrix can be transposed by the x-striding operation.

In operation 806, based on a second configuration that defines parameters for a y-striding operation, y-striding circuit 606 fetches a set of second groups of the data elements at a pattern of read addresses at the buffer memory.

Specifically, each second group of data element can be stored at consecutive memory addresses at each memory bank of the buffer memory. Each second group can include a first group of the first matrix (in a case where no x-striding operation is performed), or data elements from each first group of the first matrix (in a case where x-striding operation is performed).

The second parameters comprise a second number of the second groups to be stridden by a y-striding operation, and a y-striding distance. The y-striding circuit 606 can identify each second group based on, for example, determining a number of data elements in each second group based on the second number of the second groups. Moreover, the y-striding operation can define whether y-striding circuit 606 fetches a second group from each adjacent memory bank, or based on skipping a number of memory banks based on the y-striding distance.

In operation 808, the second groups fetched from the y-striding operation can be stored in the destination memory as adjacent second groups. As a result of the y-striding operations, data elements of each second group remains stored at consecutive addresses at the destination memory such that the lowest dimension remain the same, but second groups associated with consecutive indices at a different/ higher dimension are stored as adjacent groups, which can result in a transpose/reshaping of the matrix between the buffer memory and the destination memory.

Figure 9:
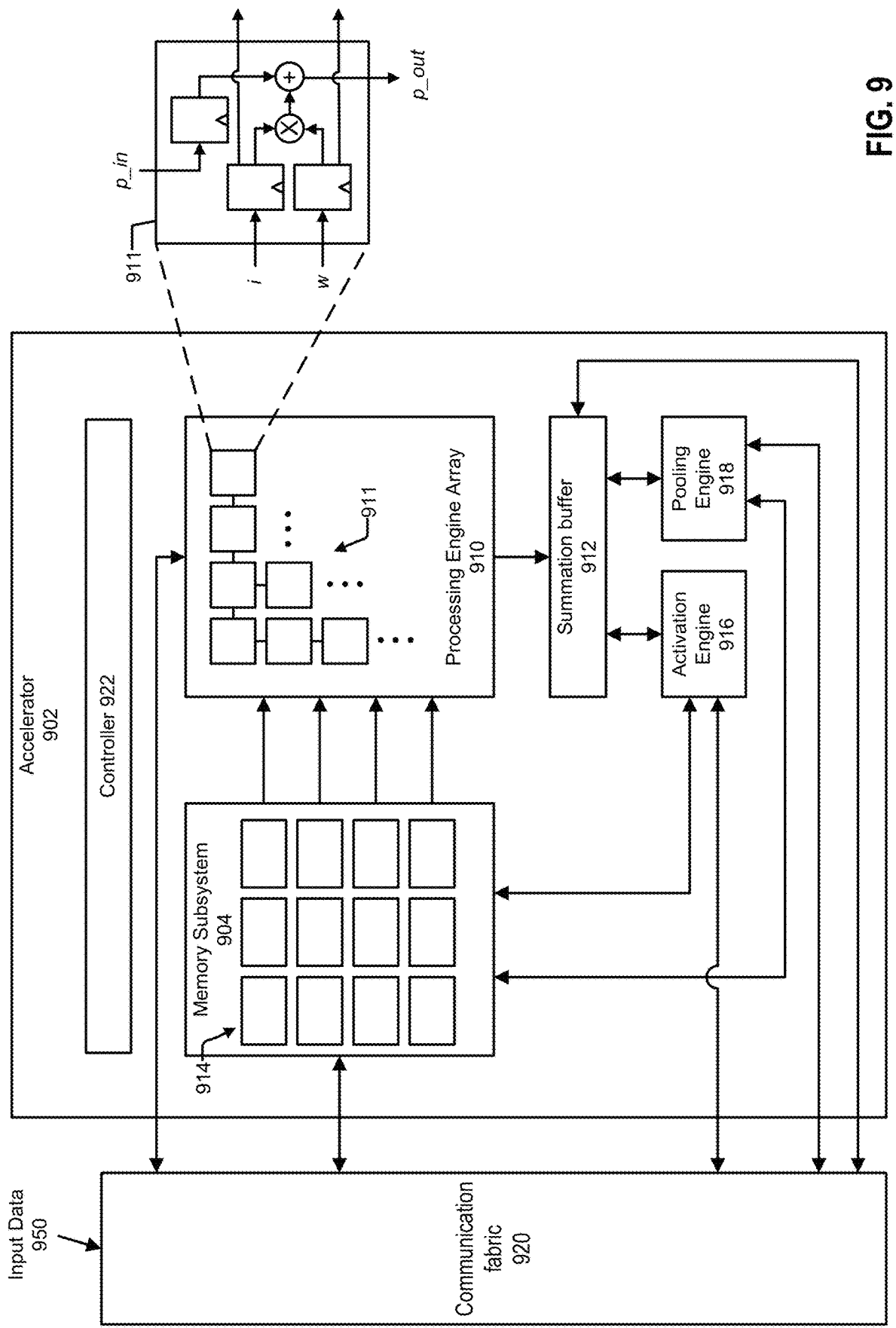
FIG. 9 illustrates an example of an integrated circuit that uses the memory system of FIGS. 6A-6C to perform matrix transpose operations.

FIG. 9 is a block diagram illustrating an example of an integrated circuit device. The example of FIG. 9 illustrates an accelerator 902. In various examples, the accelerator 902, for a set of input data (e.g., input data 950), can execute computations using a processing engine array 910, an activation engine 916, and/or a pooling engine 918. In some examples, the example accelerator 902 may be an integrated circuit component of a processor, such as a neural network processor. The processor may have other integrated circuit components, including additional accelerator engines.

In various implementations, the memory subsystem 904 can include multiple memory banks 914. In these implementations, each memory bank 914 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 914. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 904 can permit simultaneous access to the read or write channels of multiple memory banks. As another example, the memory subsystem 904 can include arbitration logic such that arbitration between, for example, the outputs of multiple memory banks 914 can result in more than one memory bank's output being used. In these and other examples, though globally managed by the memory subsystem 904, each memory bank can be operated independently of any other. In some examples, memory subsystem 904 can be coupled with memory system 600 of FIG. 6A. Memory subsystem 904 can function as a destination memory to store transposed weight and intermediate outputs, or as an input memory to store data matrices to be transposed.

Having the memory banks 914 be independently accessible can increase the efficiency of the accelerator 902. For example, values can be simultaneously read and provided to each row of the processing engine array 910, so that the entire processing engine array 910 can be in use in one clock cycle. As another example, the memory banks 914 can be read at the same time that results computed by the processing engine array 910 are written to the memory subsystem 904. In contrast, a single memory may be able to service only one read or write at a time. With a single memory, multiple clock cycles can be required, for example, to read input data for each row of the processing engine array 910 before the processing engine array 910 can be started.

In various implementations, the memory subsystem 904 can be configured to simultaneously service multiple clients, including the processing engine array 910, the activation engine 916, the pooling engine 918, and any external clients that access the memory subsystem 904 over a communication fabric 920. In some implementations, being able to service multiple clients can mean that the memory subsystem 904 has at least as many memory banks as there are clients. In some cases, each row of the processing engine array 910 can count as a separate client. In some cases, each column of the processing engine array 910 can output a result, such that each column can count as a separate write client. In some cases, output from the processing engine array 910 can be written into the memory banks 914 that can then subsequently provide input data for the processing engine array 910. As another example, the activation engine 916 and the pooling engine 918 can include multiple execution channels, each of which can be separate memory clients. The memory banks 914 can be implemented, for example, using static random access memory (SRAM).

In various implementations, the memory subsystem 904 can include control logic. The control logic can, for example, keep track of the address spaces of each of the memory banks 914, identify memory banks 914 to read from or write to, and/or move data between the memory banks 914. In some implementations, memory banks 914 can be hardwired to particular clients. For example, a set of memory banks 914 can be hardwired to provide values to the rows of the processing engine array 910, with one memory bank servicing each row. As another example, a set of memory banks can be hard wired to receive values from columns of the processing engine array 910, with one memory bank receiving data for each column.

The processing engine array 910 is the computation matrix of the example accelerator 902. The processing engine array 910 can, for example, execute parallel integration, convolution, correlation, and/or matrix multiplication, among other things. The processing engine array 910 includes multiple processing engines 911, arranged in rows and columns, such that results output by one processing engine 911 can be input directly into another processing engine 911. Processing engines 911 that are not on the outside edges of the processing engine array 910 thus can receive data to operate on from other processing engines 911, rather than from the memory subsystem 904.

In various examples, the processing engine array 910 uses systolic execution, in which data arrives at each processing engine 911 from different directions at regular intervals. In some examples, input data can flow into the processing engine array 910 from the left and weight values can be loaded at the top. In some examples weights and input data can flow from the left and partial sums can flow from top to bottom. In these and other examples, a multiply-and-accumulate operation moves through the processing engine array 910 as a diagonal wave front, with data moving to the right and down across the array. Control signals can be input at the left at the same time as weights, and can flow across and down along with the computation.

In various implementations, the number of columns in the processing engine array 910 determines the computational capacity of the processing engine array 910, and the number of rows determines the required memory bandwidth for achieving maximum utilization of the processing engine array 910. The processing engine array 910 can have, for example, 64 columns and 428 rows, or some other number of columns and rows.

An example of a processing engine 911 is illustrated in FIG. 9 in an inset diagram. As illustrated by this example, a processing engine 911 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 911.

In the illustrated example, an input from above can include a partial sum, p_in, provided either from another processing engine 911 or from a previous round of computation by the processing engine array 910. When starting a computation for a new set of input data, the top row of the processing engine array 910 can receive a fixed value for p_in, such as zero. As illustrated by this example, i and w are multiplied together and the result is summed with p_in to produce a new partial sum, p_out, which can be input into another processing engine 911. Various other implementations of the processing engine 911 are possible.

Outputs from the last row in the processing engine array 910 can be temporarily stored in the results buffer 912. The results can be intermediate results, which can be written to the memory banks 914 to be provided to the processing engine array 910 for additional computation. Alternatively, the results can be final results, which, once written to the memory banks 914 can be read from the memory subsystem 904 over the communication fabric 920, to be output by the system.

In some implementations, the accelerator 902 includes an activation engine 916. In these implementations, the activation engine 916 can combine the results from the processing engine array 910 into one or more output activations. For example, for a convolutional neural network, convolutions from multiple channels can be summed to produce an output activation for a single channel. In other examples, accumulating results from one or more columns in the processing engine array 910 may be needed to produce an output activation for a single node in the neural network. In some examples, activation engine 916 can be bypassed.

In various examples, the activation engine 916 can include multiple separate execution channels. In these examples, the execution channels can correspond to the columns of the processing engine array 910, and can perform an operation on the outputs of a column, the result of which can be stored in the memory subsystem 904. In these examples, the activation engine 916 may be able to perform between 1 and n parallel computations, where n is equal to the number of columns in the processing engine array 910. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 902 can include a pooling engine 918. Pooling is the combining of outputs of the columns of the processing engine array 910. Combining can include for example, computing a maximum value, a minimum value, an average value, a median value, a summation, a multiplication, or another logical or mathematical combination. In various examples, the pooling engine 918 can include multiple execution channels that can operating on values from corresponding columns of the processing engine array 910. In these examples, the pooling engine 918 may be able to perform between 1 and n parallel computations, where n is equal to the number of columns in the processing engine array 910. In various examples, execution channels of the pooling engine 918 can operate in parallel and/or simultaneously. In some examples, the pooling engine 918 can be bypassed.

Herein, the activation engine 916 and the pooling engine 918 may be referred to collectively as execution engines. The processing engine array 910 is another example of an execution engine. Another example of an execution engine is a Direct Memory Access (DMA) engine, which may be located outside the accelerator 902.

Input data 950 can arrive over the communication fabric 920. The communication fabric 920 can connect the accelerator 902 to other components of a processor, such as a DMA engine that can obtain input data 950 from an Input/Output (I/O) device, a storage drive, or a network interface. The input data 950 can be, for example one-dimensional data, such as a character string or numerical sequence, or two-dimensional data, such as an array of pixel values for an image or frequency and amplitude values over time for an audio signal. In some examples, the input data 950 can be three-dimensional, as may be the case with, for example, the situational information used by a self-driving car or virtual reality data. In some implementations, the memory subsystem 904 can include a separate buffer for the input data 950. In some implementations, the input data 950 can be stored in the memory banks 914 when the accelerator 902 receives the input data 950.

In some examples, the accelerator 902 can implement a neural network processing engine. In these examples, the accelerator 902, for a set of input data 950, can execute a neural network to perform a task for which the neural network was trained. Executing a neural network on a set of input data can be referred to as inference or performing inference.

The weights for the neural network can be stored in the memory subsystem 904, along with input data 950 on which the neural network will operate. The neural network can also include instructions, which can program the processing engine array 910 to perform various computations on the weights and the input data. The instructions can also be stored in the memory subsystem 904, in the memory banks 914 or in a separate instruction buffer. The processing engine array 910 can output intermediate results, which represent the outputs of individual layers of the neural network. In some cases, the activation engine 916 and/or pooling engine 918 may be enabled for computations called for by certain layers of the neural network. The accelerator 902 can store the intermediate results in the memory subsystem 904 for inputting into the processing engine array 910 to compute results for the next layer of the neural network. The processing engine array 910 can further output final results from a last layer of the neural network. The final results can be stored in the memory subsystem 904 and then be copied out to host processor memory or to another location.

Figure 10:
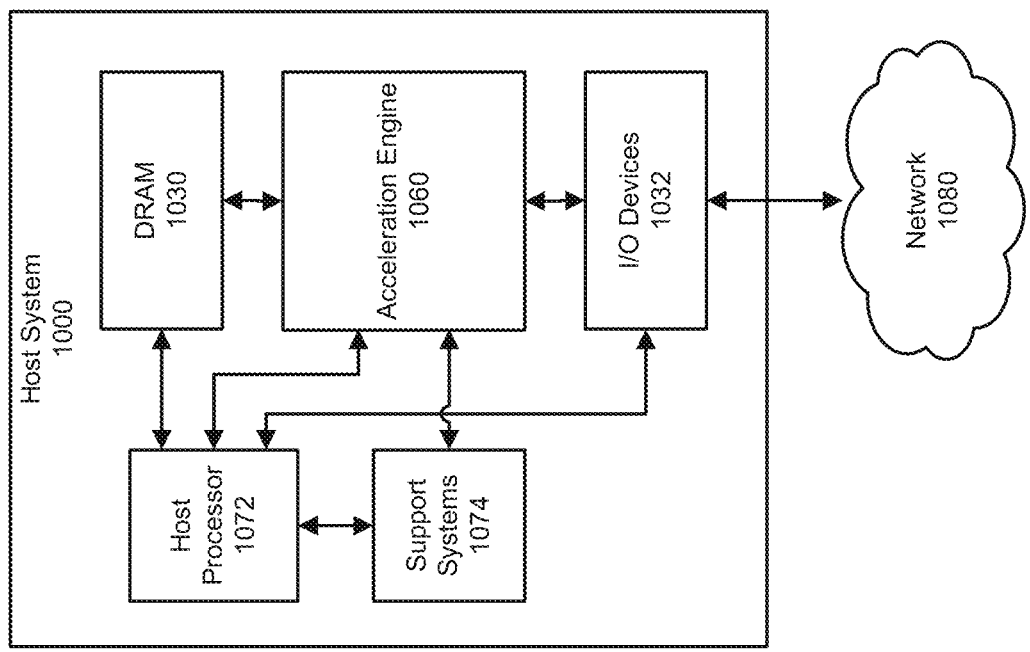
FIG. 10 illustrates an example of a host system that can use the memory system of FIGS. 6A-6C to perform matrix transpose operations.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software. In some examples, a software program can also use acceleration engine 1060 to perform a training operation.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code. In some examples, DRAM 1030 can be coupled with memory system 600 of FIG. 6A. DRAM 1030 can function as a destination memory to store transposed weight and intermediate outputs, or as an input memory to store data matrices to be transposed. For example, the intermediate outputs generated in forward propagation operation can be transposed and stored in DRAM 1030, as described above.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks.

Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A memory access circuit configured to perform a transpose operation, comprising:
   an x-striding circuit configured to:
      fetch data elements of a first matrix from a source memory, the data elements comprising a set of first groups of the data elements; and
      store the set of first groups of the data elements at a buffer memory based on a first transpose configuration, wherein the first transpose configuration is indicated by a command that is received by the memory access circuit; and
   a y-striding circuit configured to:
      fetch a set of second groups of the data elements from the buffer memory based on a second transpose configuration, wherein the second transpose configuration is indicated by the command that is received by the memory access circuit; and
      store the set of second groups of the data elements at a destination memory to form a second matrix, the second matrix being a transposed version of the first matrix;
   wherein the buffer memory is separate from the source memory and the destination memory, and wherein, during the transpose operation, the y-striding circuit is configured to read from but not write to the buffer memory.

2. The memory access circuit of claim 1, wherein the buffer memory includes a plurality of banks of memory devices at which the set of first groups of the data elements are stored and from which the set of second groups of the data elements are fetched.

3. The memory access circuit of claim 2, wherein the data elements for each of the set of first groups are stored across different banks of the plurality of banks.

4. The memory access circuit of claim 2, wherein the data elements for each of the set of first groups are stored at one bank of the plurality of banks.

5. The memory access circuit of claim 2, wherein the data elements for the set of second groups are fetched from consecutive banks of the plurality of banks.

6. The memory access circuit of claim 2, wherein the data elements for the set of second groups are fetched from banks of the plurality of banks separated by a number of banks.

7. The memory access circuit of claim 1, wherein the command indicates an x-striding distance used by the x-striding circuit.

8. The memory access circuit of claim 1, wherein the command indicates an x number of groups used by the x-striding circuit.

9. The memory access circuit of claim 1, wherein the command indicates a y-striding distance used by the y-striding circuit.

10. The memory access circuit of claim 1, wherein the command indicates a y number of groups used by the y-striding circuit.

11. A method for performing a transpose operation, the method comprising:
   receiving, at a memory access circuit, a command that indicates a first transpose configuration and a second transpose configuration;
   fetching, by an x-striding circuit of the memory access circuit, data elements of a first matrix from a source memory, the data elements comprising a set of first groups of the data elements;
   storing, by the x-striding circuit, the set of first groups of the data elements at a buffer memory based on the first transpose configuration;
   fetching, by a y-striding circuit of the memory access circuit, a set of second groups of the data elements from the buffer memory based on the second transpose configuration; and
   storing, by the y-striding circuit, the set of second groups of the data elements at a destination memory to form a second matrix, the second matrix being a transposed version of the first matrix;
   wherein the buffer memory is separate from the source memory and the destination memory, and wherein, during the transpose operation, the y-striding circuit reads from but does not write to the buffer memory.

12. The method of claim 11, wherein the buffer memory includes a plurality of banks of memory devices at which the set of first groups of the data elements are stored and from which the set of second groups of the data elements are fetched.

13. The method of claim 12, wherein the data elements for each of the set of first groups are stored across different banks of the plurality of banks.

14. The method of claim 12, wherein the data elements for each of the set of first groups are stored at one bank of the plurality of banks.

15. The method of claim 12, wherein the data elements for the set of second groups are fetched from consecutive banks of the plurality of banks.

16. The method of claim 12, wherein the data elements for the set of second groups are fetched from banks of the plurality of banks separated by a number of banks.

17. The method of claim 11, wherein the command indicates an x-striding distance used by the x-striding circuit.

18. The method of claim 11, wherein the command indicates an x number of groups used by the x-striding circuit.

19. The method of claim 11, wherein the command indicates a y-striding distance used by the y-striding circuit.

20. The method of claim 11, wherein the command indicates a y number of groups used by the y-striding circuit.

* * * * *